July 9, 1968   A. W. ALBRECHT   3,391,520
APPARATUS FOR WRAPPING A CONFECTIONERY PRODUCT
Filed Nov. 13, 1964   16 Sheets-Sheet 1

INVENTOR.
ARTHUR W. ALBRECHT
BY
Dugger Braddock Johnson & Westman
ATTORNEYS

INVENTOR.
ARTHUR W. ALBRECHT
BY
Dugger Braddock Johnson & Westman
ATTORNEYS

July 9, 1968  A. W. ALBRECHT  3,391,520
APPARATUS FOR WRAPPING A CONFECTIONERY PRODUCT
Filed Nov. 13, 1964  16 Sheets-Sheet 5

FIG. 5

INVENTOR.
ARTHUR W. ALBRECHT
BY
Dugger Braddock Johnson & Westman
ATTORNEYS

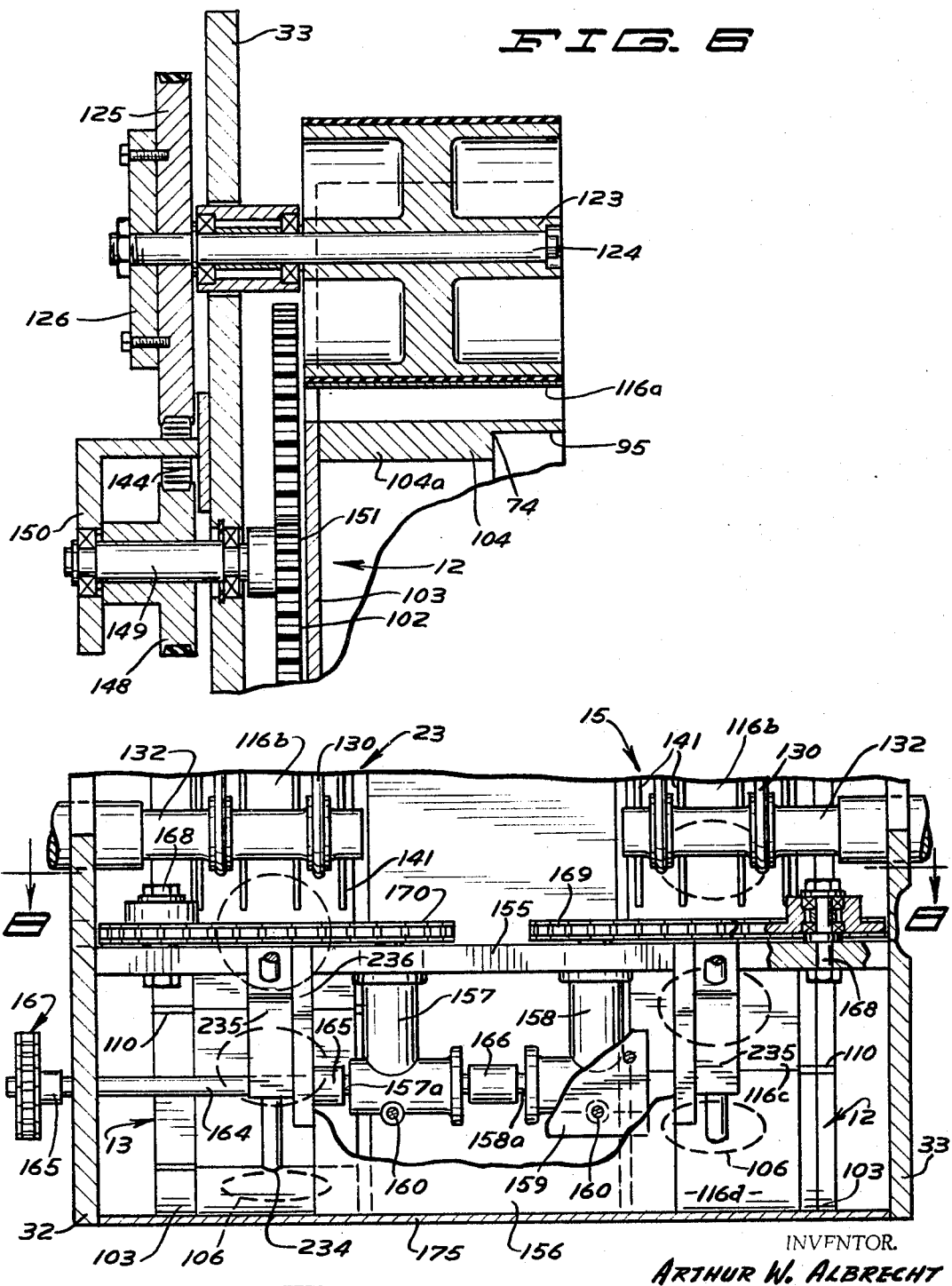

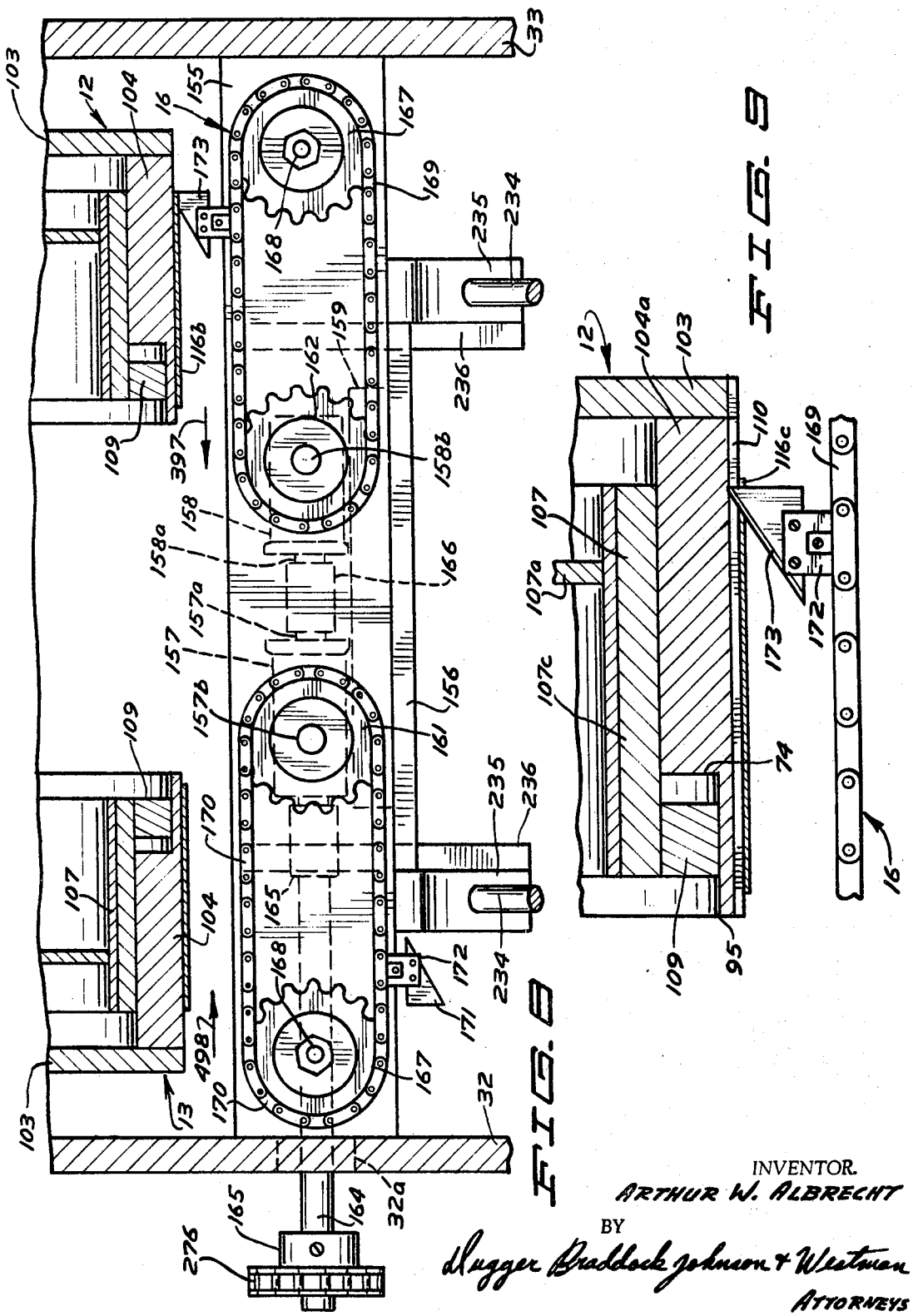

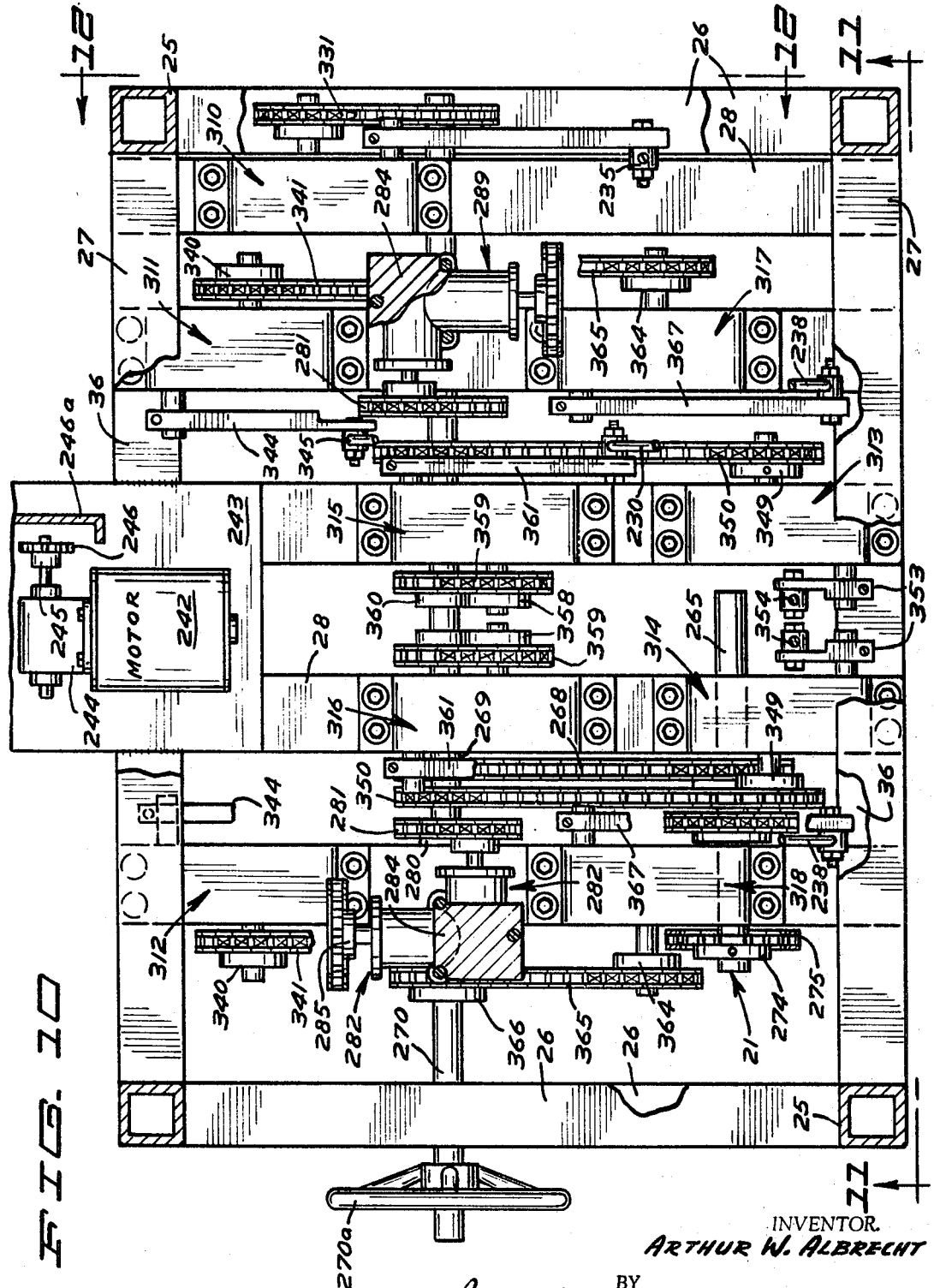

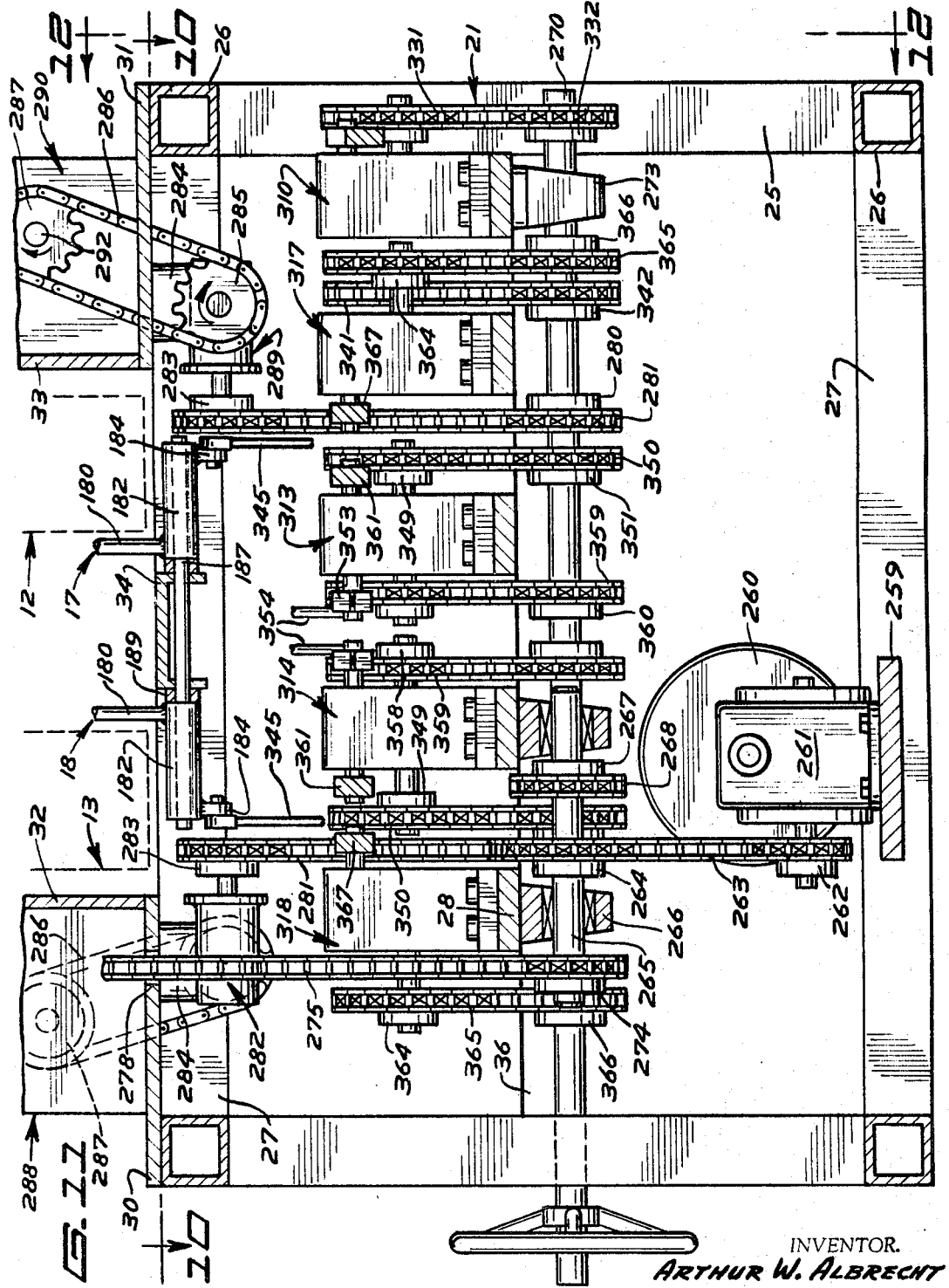

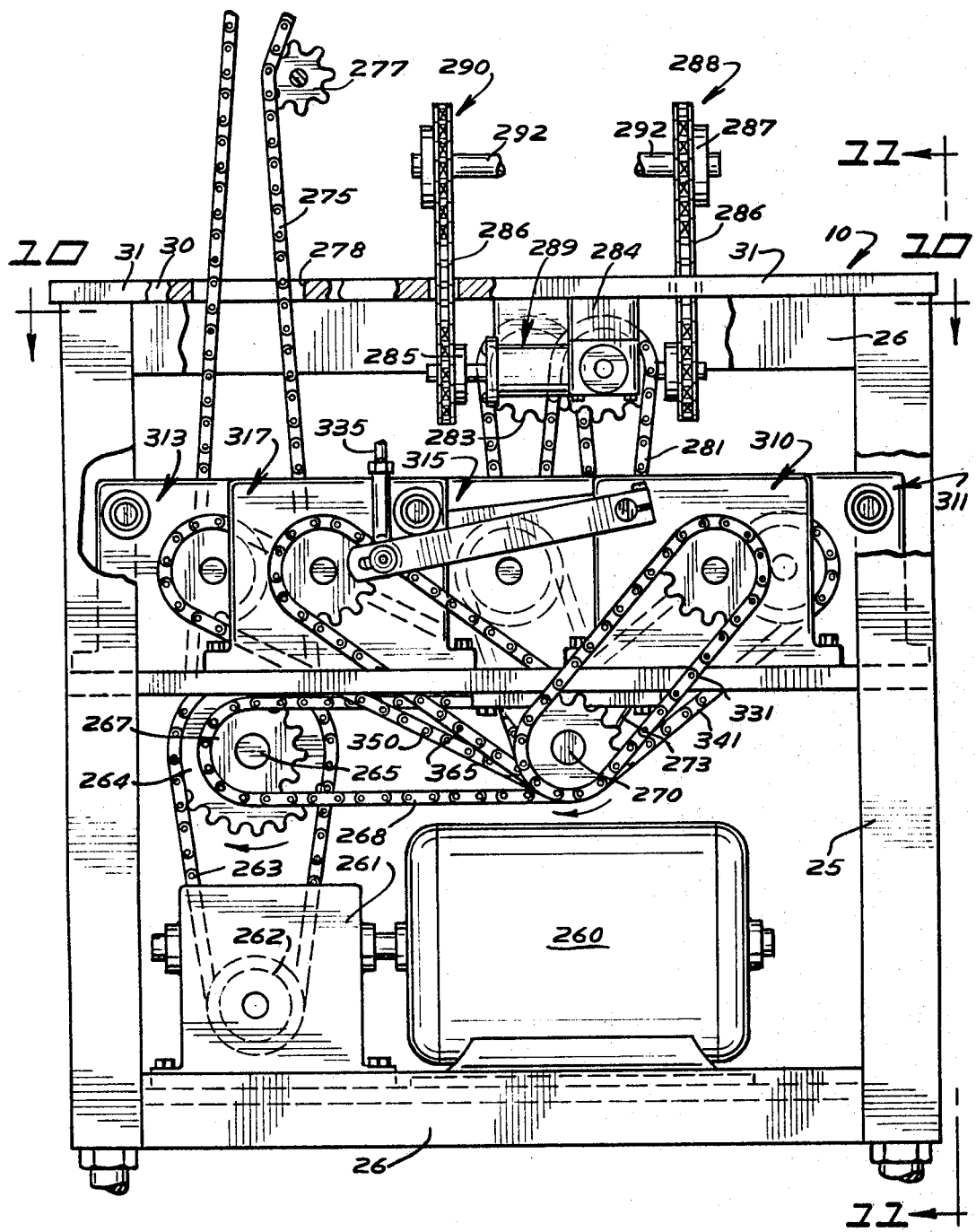

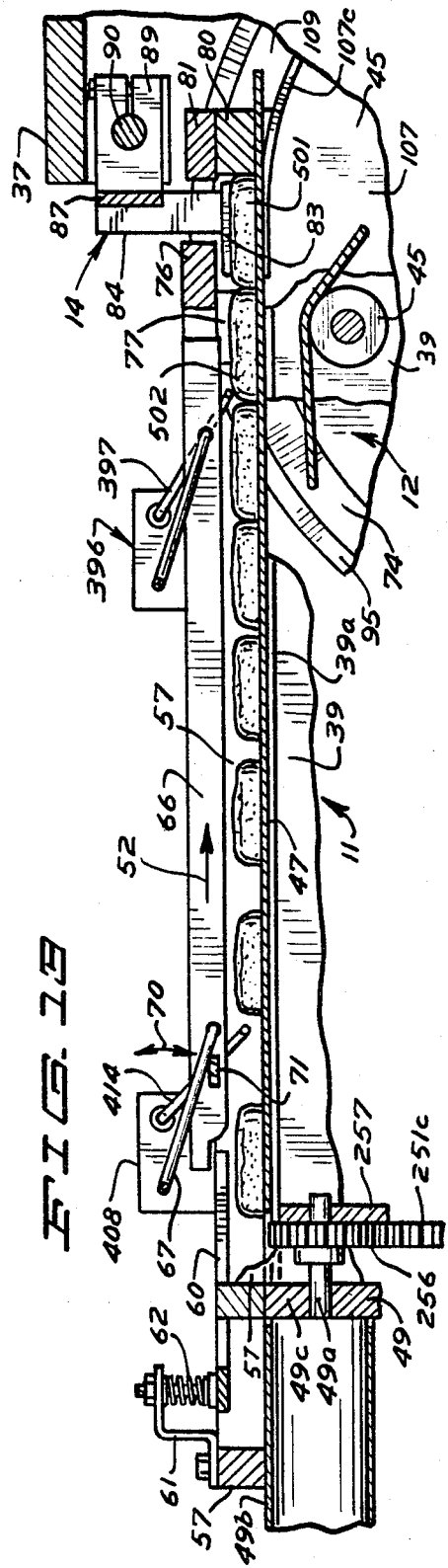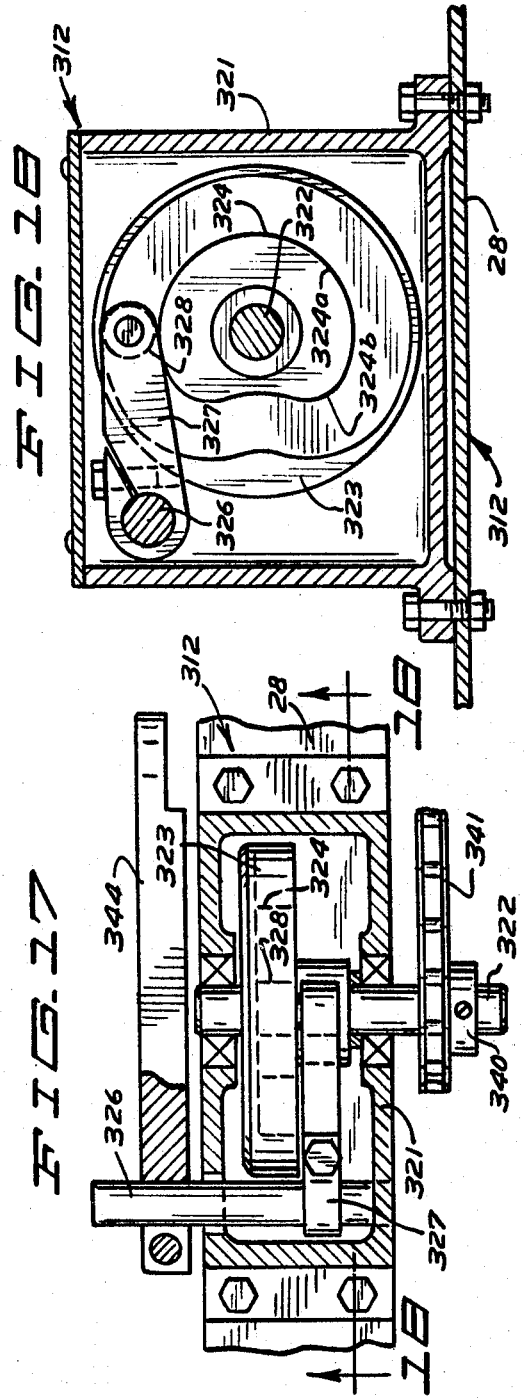

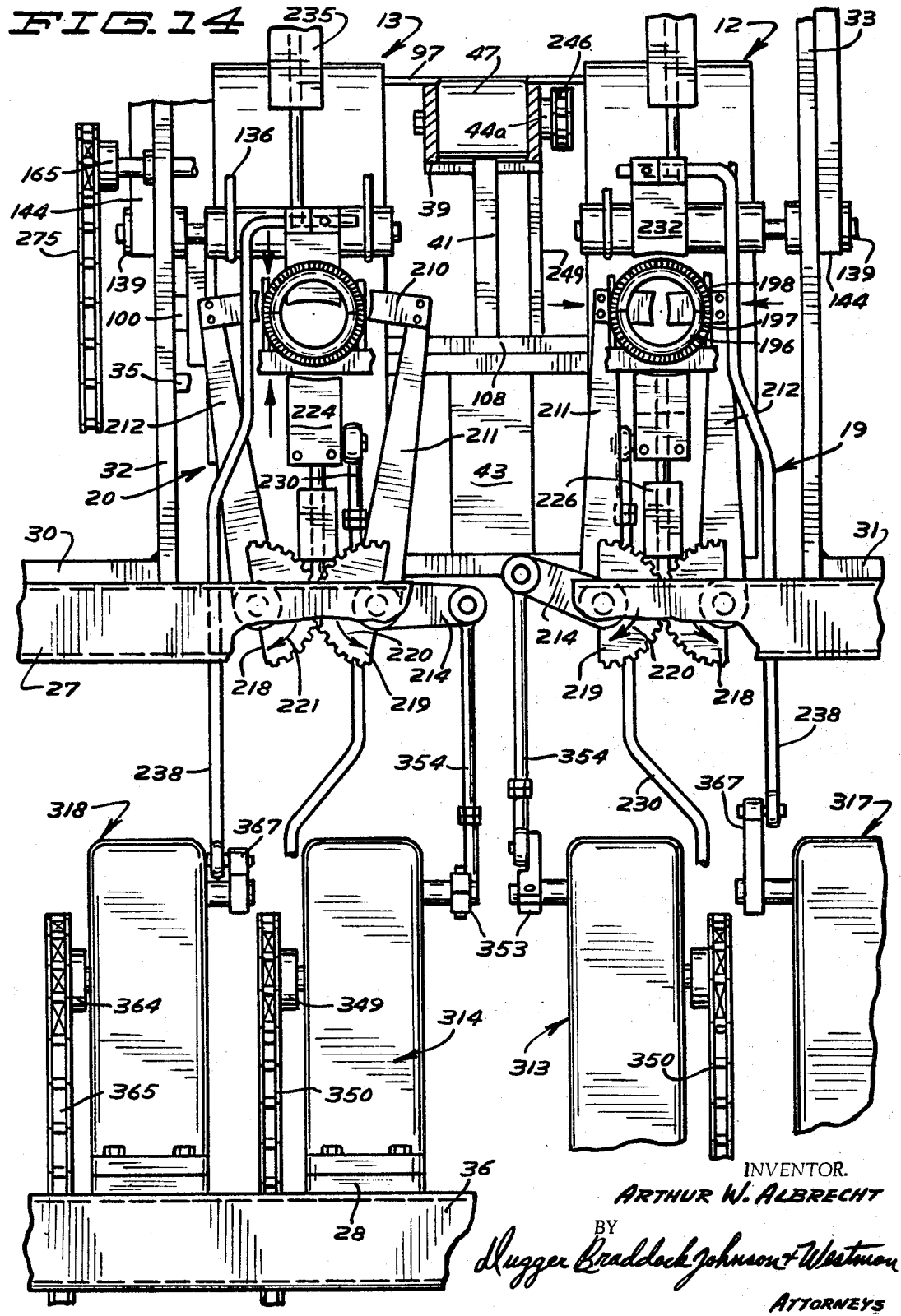

INVENTOR.
ARTHUR W. ALBRECHT
BY
Dugger Braddock Johnson & Westman
ATTORNEYS

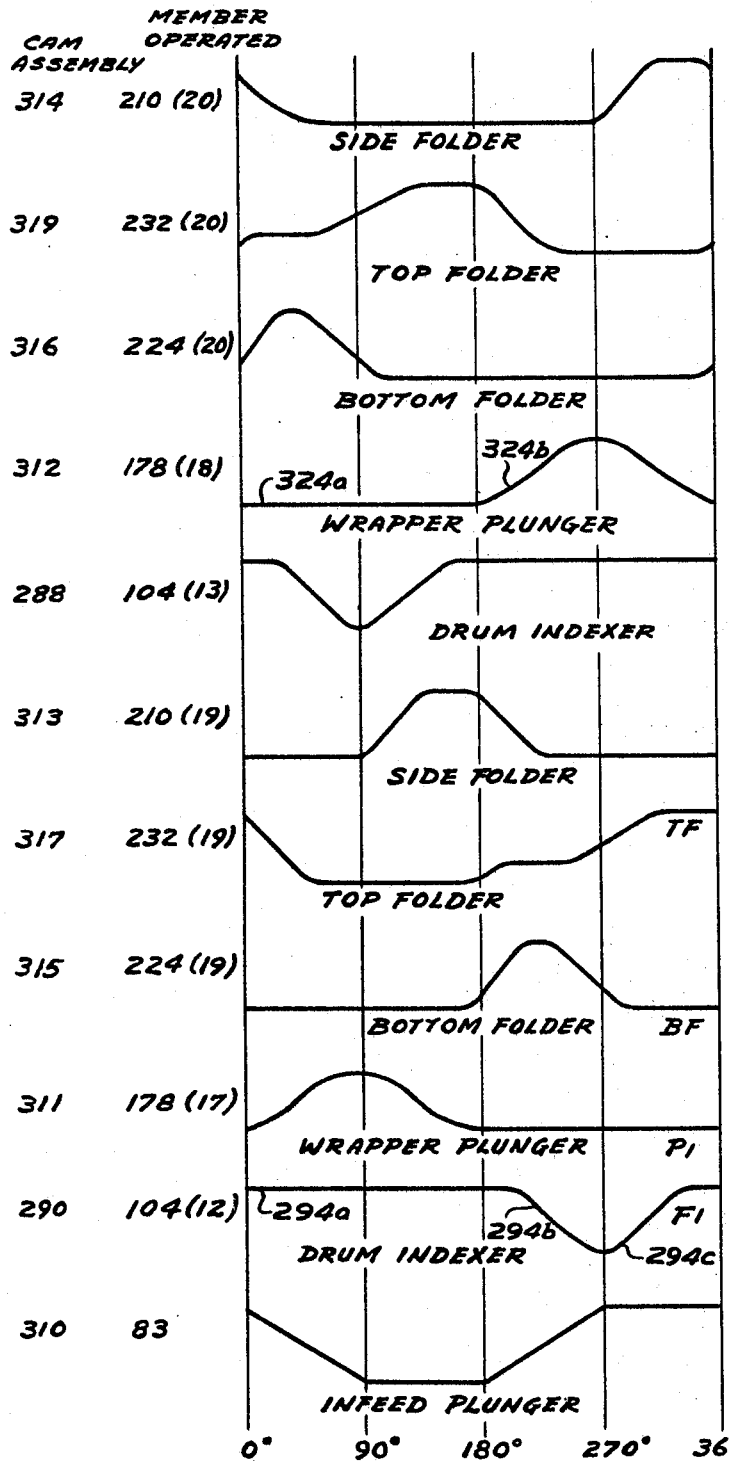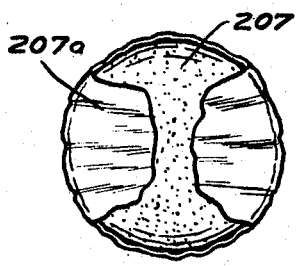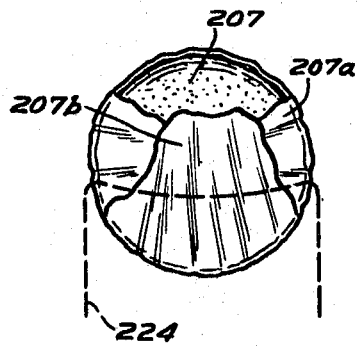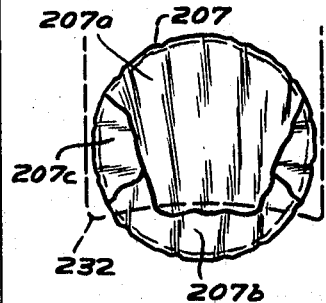

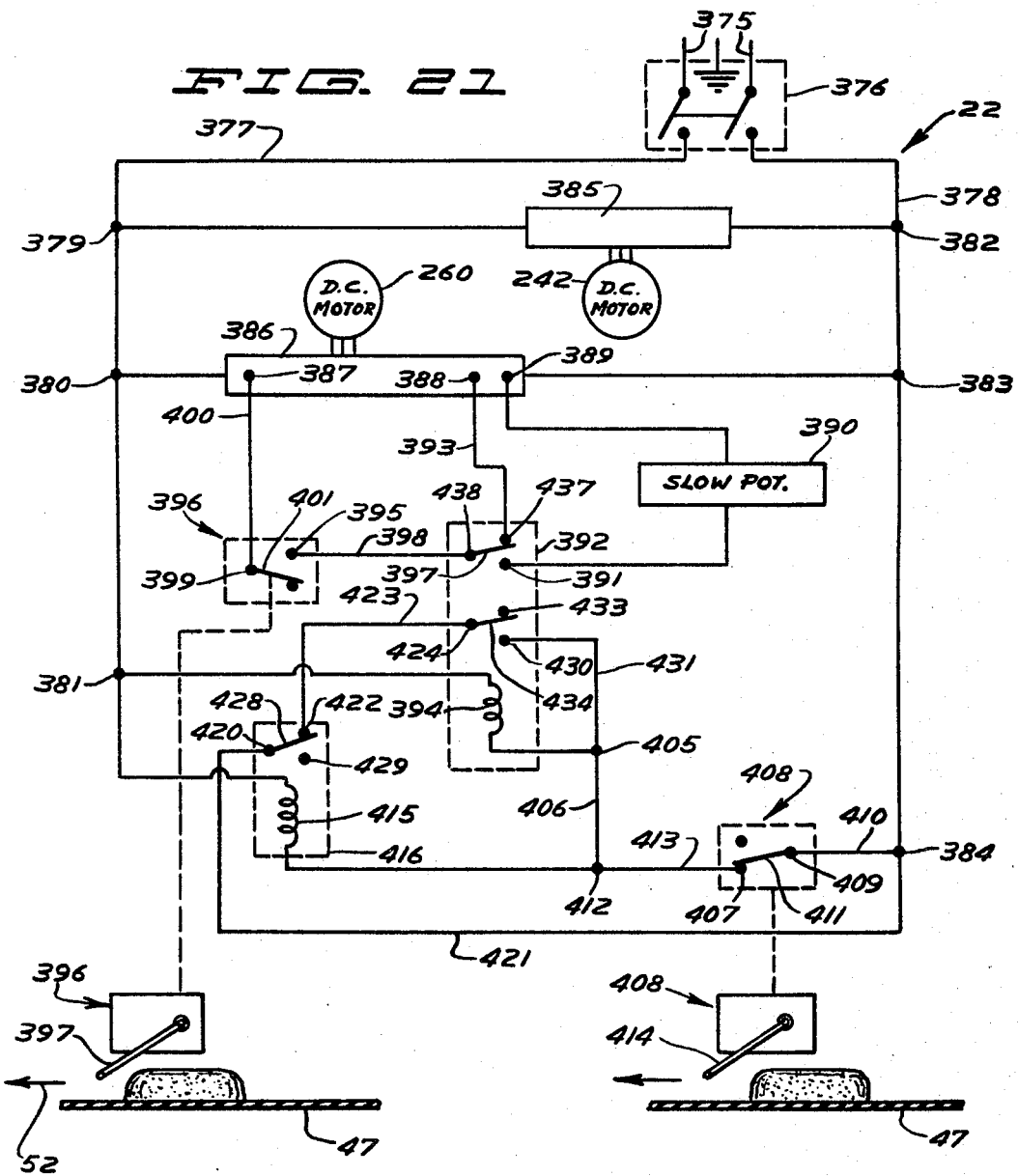

July 9, 1968 A. W. ALBRECHT 3,391,520
APPARATUS FOR WRAPPING A CONFECTIONERY PRODUCT
Filed Nov. 13, 1964 16 Sheets-Sheet 16
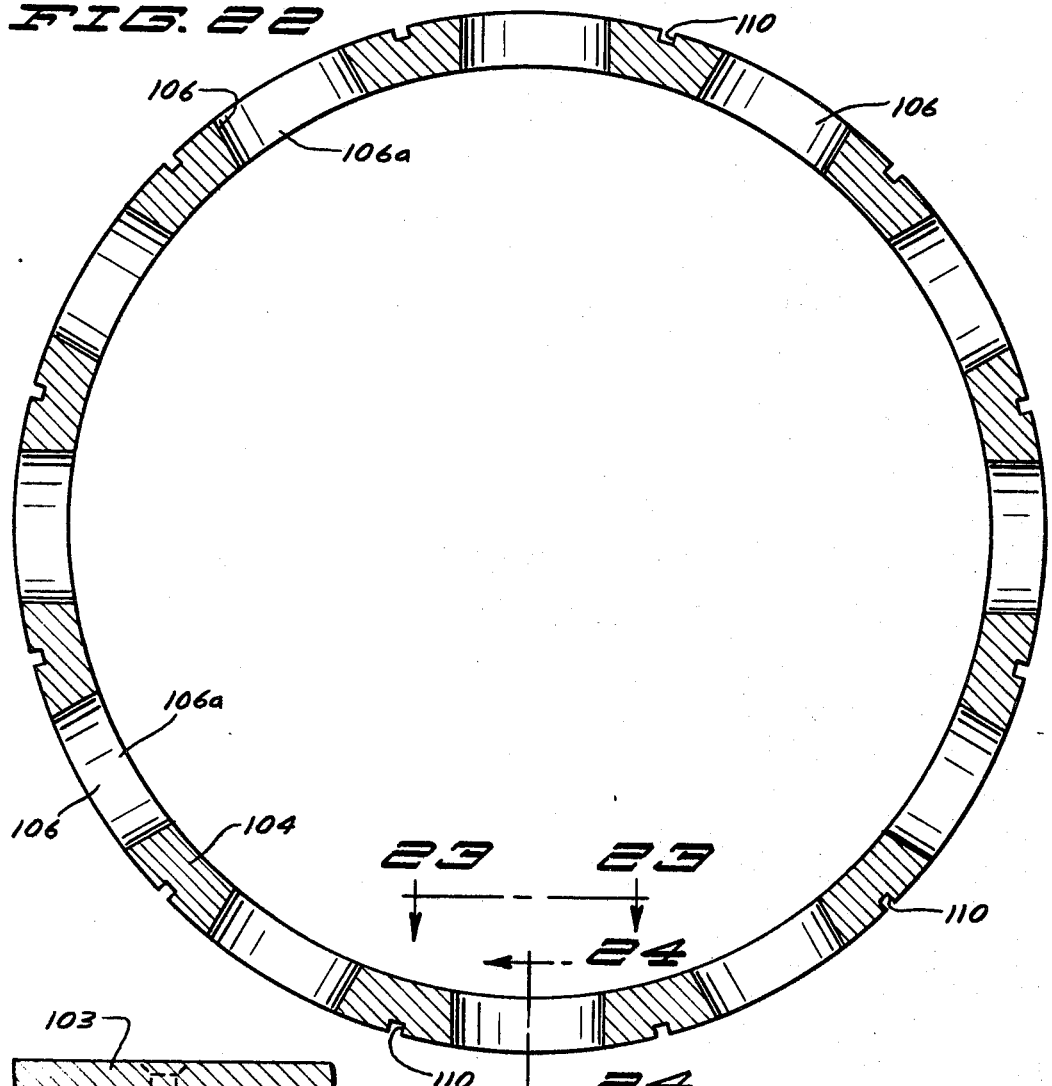
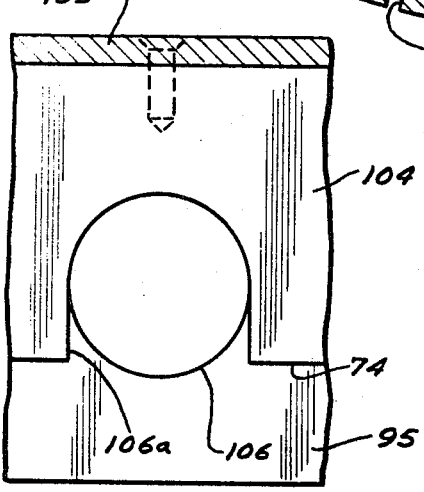
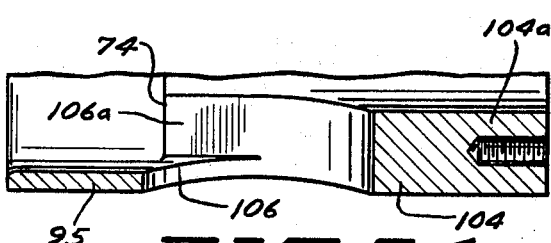
INVENTOR.
ARTHUR W. ALBRECHT
BY
ATTORNEYS United States Patent Office 3,391,520
Patented July 9, 1968

3,391,520
APPARATUS FOR WRAPPING A
CONFECTIONERY PRODUCT
Arthur W. Albrecht, West St. Paul, Minn., assignor to Pearson Candy Company, St. Paul, Minn., a corporation of Minnesota
Filed Nov. 13, 1964, Ser. No. 411,028
26 Claims. (Cl. 53—202)

ABSTRACT OF THE DISCLOSURE

A conveyor assembly extends between two drum assemblies, which are alternately indexd to rotate about a common axis, for feeding a piece of a confectionery product adjacent to a drum aperture of the drum assembly that is stationary. Wrapper feed mechanism feeds a web over the exterior surface of each drum assembly, a severing assembly and hold drum assembly severing a wrapper and retaining the wrapper adjacent the piece of product in the aperture until a plunger pushes said piece through the aperture. The plunger moves the piece and wrapper into a wrapper folder assembly that initially bends the outer perimetric portions of the wrapper and subsequently folds the outer perimetric portions of the wrapper to complete the wrapping of the confectionery piece.

---

This invention relates to new and novel apparatus for individually wrapping separate pieces of confectionery product. More particularly this invention relates to a mint wrapping machine for automatically separately feeding individual pieces of a confectionery product at an infeed station, thence separately conveying said piece of product at the infeed station adjacent a continuous web to a cut off station, then severing said web to form a wrapper and subsequently pushing the piece of product against the severed wrapper and folding the wrapper about the surfaces of said piece of product.

One of the objects of this invention is to provide a new and novel mint wrapping machine for conveyingly retaining a piece of confectionery product adjacent a continuous web, thence while said piece is being retained by the conveyor mechanism, severing the web; and subsequently pushing said piece against the severed wrapper to partially fold the wrapper about said piece, and then complete the folding of the wrapper. Another object of this invention is to provide a double headed mint wrapping machine that includes new and novel mechanism for separately indexing each head with a mint through a plurality of angular locations while a continuous web is being retained adjacent one surface of the pieces for each head; and for each head severing the web to form a wrapper, and subsequently forcing the piece aginst the wrapper through mechanism to fold the outer peripheral portions of the wrapper about said piece and then complete the folding of the outer peripheral portions about said piece.

A further object of this invention is to provide a new and novel drum assembly for indexing a non wrapped confectionery piece from an infeed station to a wrapping station; plunger mechanism for forcing the confectionery piece out the drum assembly and moving said confectionery piece to partially fold a wrapper about said piece, and subsequently completing the folding of said wrapper. Still another object of this invention is to provide a new and novel apertured drum assembly for indexingly conveying a confectionery piece from an infeed station to a wrapper station, wrapper hold down and severing mechanism for feeding a piece of web; and from the web, forming individual wrappers that are moved to the wrapping station; and then at the wrapper station, push the mint out of a drum assembly aperture and against the severed wrapper to rearwardly bend the outer perimetric portions of the wrapper; and subsequently fold the outer perimetric portions of the wrapper to complete the wrapping of the confectionery piece.

Still another object of the invention is to provide new and novel apparatus for wrapping confectionery pieces that includes a double headed mint wrapping machine together with wrapper cut off mechanism, wrapper feed and hold down mechanism, and mechanism for wrapping the mint piece associated with each head, and common means for feeding unwrapped piece first to one of said heads and thence to the other of said heads. An additional object of this invention is to provide in a double headed mint machine continuously driven shaft operated cam mechanism for alternately indexing a pair of apertured drum assemblies and common unwrapped confectionery piece infeed mechanism to alternately feed an unwrapped mint to one of the drum assemblies and then to the other; and separate mechanism for holding a web against each drum assembly, severing each web to form individual wrappers, moving a mint from each drum assembly to partially wrap the confectionery piece; and then with a series of folders for each drum assembly to complete the wrapping operation; the respective series of elements being synchronized with the respective drum assembly but out of phase with those for the other drum assembly.

A still further object of the invention is to provide mechanism for wrapping confectionery pieces such as mints that includes translating a mint in a forward direction against a wrapper to fold the wrapper portions rearwardly, and in synchronism with the movement of the mint in a forward direction, operating fold members to force the outer perimetric portions of the wrapper to complete the wrapping operation while preventing the mint tipping in a rearward direction until the next mint to be wrapped is moved in a forward direction to a position closely adjacent thereto.

An additional object of the invention is to provide new and novel wrapping mechanism for first pushing a confectionery piece against a wrapper of substantially larger size to bend the outer perimetric portions of the wrapper in a direction opposite the movement of the confectionery piece, and thence sequentially folding side portions of the wrapper, next the bottom portion of the wrapper, and thence a top portion of the wrapper to complete the formation of a completely wrapped confectionery piece. A still further object of this invention is to provide new and novel wrapping mechanism that includes an outlet choke subassembly aligned with and axially spaced from a tubular member, moving an unwrapped confectionery piece against a wrapper through the tubular member to bend outer perimetric portions of the wrapper rearwardly as a portion of the wrapper and the confectionery piece are moved into the outlet choke, forming side fold wrapper portions on opposite sides of the confectionery piece, and then sequentially forming bottom and top fold wrapper portions to completely wrap the confectionery piece. Another object of this invention is to provide new and novel mechanism for, through forming bottom and top wrapper folded portions about a confectionery piece, forcing the confectionery piece forwardly in an outlet choke.

An additional object of this invention is to provide in a machine that individually wraps confectionery pieces, new and novel structure for holding a web against an aperture drum to indexingly feed said web to a cut off station at the same relative angular rate that an individual piece radially adjacent each aperture are angularly moved between a confectionery piece infeed station and a confectionery piece wrapping station. Another object of the invention is to provide a new and novel drum assembly having outer transversely extending slots, mechanism for holding a continuous web in abutting engagement with an arcuate portion of said assembly; and while the drum assembly is in a dwell position, draw a continuously moving knife through the adjacent slot to sever the continuous web to form a wrapper for a confectionery piece.

A still further object of this invention, is to provide a mint wrapping machine for wrapping mints and similar shaped products at a much higher rate than before achieved. Another object of the invention is to provide new and novel sensing control mechanism for automatically varying the infeed rate of the mints to a mint wrapping machine in accordance with the speed of the wrapping operation.

Other and further objects are those inherent in the invention herein illustrated, described and claimed, and will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by reference to the drawings in which the same reference numerals refer to the same parts and in which:

FIGURE 5 is an enlarged sectional view generally taken along the line and in the direction of arrows 5—5 of FIGURE 4, said view illustrating portions of the web hold down structure and portions of the wrapper hold down mechanism in cross section, and a portion of the mint infeed plunger operating mechanism;

FIGURE 6 is an enlarged fragmentary cross sectional view generally taken along the line and in the direction of the arrows 6—6 of FIGURE 4 to illustrate the drive for the web hold down mechanism;

FIGURE 7 is a view generally taken along the line and in the direction of arrows 7—7 of FIGURE 3 at the cut off station to illustrate the web cut off assembly and some of the other structure adjacent thereto, portions of some of the overlaying structure being broken away to more clearly illustrate other structure therebeneath;

FIGURE 8 is a further enlarged view generally taken along the line and in the direction of arrows 8—8 of FIGURES 3 and 7, said view being generally taken at right angles of FIGURE 7 to further illustrate the web cut off assembly and some of the structure adjacent thereto;

FIGURE 9 is a still further enlarged view, part in cross section, to illustrate the mounting of a cut off knife as it moves through a drum slot (the thickness of the web being exaggerated);

FIGURE 10 is a horizontal view generally taken along the line and in the direction of arrows 10—10 of FIGURES 2, 11 and 12 to illustrate the drive mechanism of the apparatus of this invention;

FIGURE 11 is a front view of the structure of FIGURE 10, said view being generally taken along the line and in the direction of the arrows 11—11 of FIGURES 1, 10 and 12;

FIGURE 12 is a right hand side view of the mechanism of FIGURE 10, said view being generally taken along the line and in the direction of the arrow 12—12 of FIGURES 1, 10 and 11;

FIGURE 13 is an enlarged fragmentary view part in cross section of the mechanism for feeding unwrapped mints to a drum assembly at the infeed station, said view generally being taken along the line and in the direction of the arrows 13—13 of FIGURE 1;

FIGURE 14 is an enlarged fragmentary front view generally taken along the line and in the direction of the arrows 14—14 of FIGURE 4 to illustrate the mechanism for folding the wrappers about the mints at about the 300° angular position of the secondary drive shaft, portions of said view being broken away;

FIGURE 17 is an enlarged horizontal view of one of the cam assemblies of this invention, various portions of the cam assembly housing being broken away;

FIGURE 18 is a cross sectional view of the structure of FIGURE 17, said view being generally taken along the line and in the direction of the arrows 18—18 of FIGURE 17;

FIGURE 19 is a diagrammatic plan view of an exemplary form of cam sequence of the present invention for controlling the various mechanism;

FIGURES 20A, 20B and 20C are a series of views illustrating various steps in the folding of a wrapper about a mint, FIGURE 20A showing the folded side portions, FIGURE 20B showing the folded side and bottom portions and FIGURE 20C the completely wrapped mint;

FIGURE 21 is a diagrammatic view of the electric circuits, components and controls of the present invention;

FIGURE 22 is an enlarged vertical cross sectional view generally taken along the line and in the direction of the arrows 22—22 of FIGURE 5 showing just the drum member;

Figure 1:
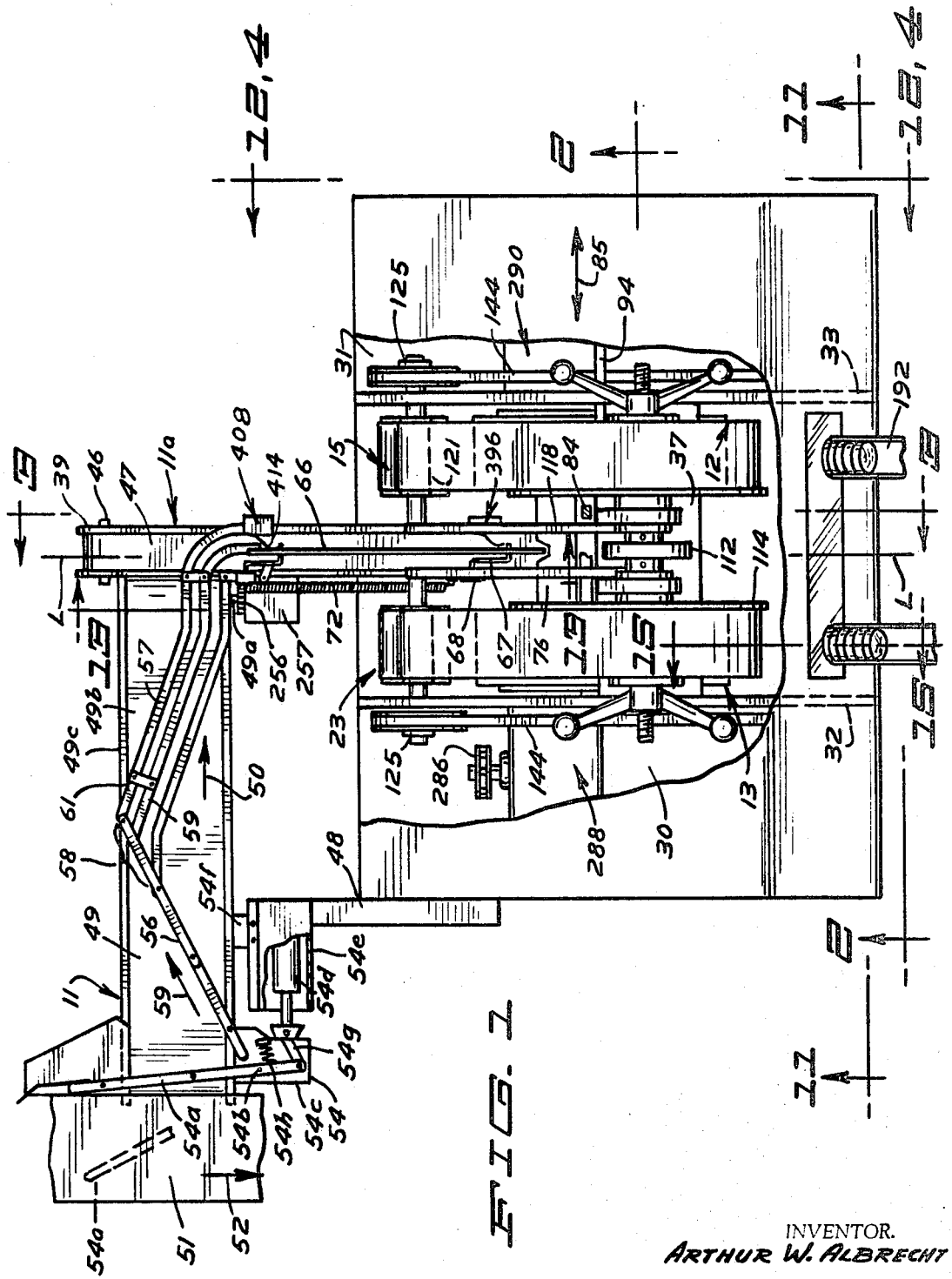
FIGURE 1 is a plan view of the mint wrapping machine and the adjunct conveyor apparatus for feeding unwrapped mints into said machine, portions of the housing being broken away to more clearly illustrate the structure therebeneath.

FIGURE 23 is a fragmentary horizontal view generally taken along the line and in the direction of the arrows 23—23 of FIGURE 24 showing a portion of the drum member and annular plate secured thereto, said view showing one of the drum apertures and U-shaped slot; and FIGURE 24 is a fragmentary cross sectional view of the drum member, said view being generally taken along the line and in the direction of the arrows 24—24 of FIGURE 23 to more clearly show a drum member aperture and U-shaped slot.

Basically the machine of this invention comprises a frame generally designated 10, an infeed control and conveyor assembly generally designated 11, drum assemblies generally designated 12 and 13 respectively; a mint infeed assembly generally designated 14; a pair of wrapper feed hold down assemblies generally designated 15 and 23 respectively; a wrapper cut off assembly, generally designated 16; plunger subassemblies, generally designated 17 and 18 respectively; wrapper folding assemblies, generally designated 19 and 20 respectively; drive mechanism, generally designated 21; and electrical control circuitry and components, generally designated 22. First the frame will be generally described. For purposes of facilitating the description of the invention it will be assumed it has a longitudinal axis L—L.

*Frame.*—Referring in particular to FIGURES 1, 2, 3 and 10, the frame 10 includes four channel uprights 25, four upper and lower longitudinally extending cross pieces 26, and four upper and lower transverse cross pieces 27 joined together to form an opened, generally rectangular frame portion. With reference to the aforementioned frame members of FIGURE 10 it is to be noted that portions of certain of the aforementioned frame members are broken away to illustrate structure therebeneath. Five parallel, spaced cross pieces 28 are secured to the opposite ends to respective intermediate transverse channel 36 to mount structure described hereinafter, channels 36 being secured to the adjacent uprights. An intermediate upper channel 29 is secured at opposite ends to the upper longitudinal frame members 26, an intermediate short channel 34 being attached to channel 29 and the rear transverse frame member 27 (see FIGURE 3).

Mounted on the upper frame members 26, 27 and 29 are a left hand mounting plate 30 and a right hand mounting plate 31, said plates extending longitudinal and being mounted in spaced relationship to leave central opening. Mounted on plates 30 and 31 are upright plates 32 and 33 respectively which extend parallel to one another and located to extend along the edges of the mounting plates that are adjacent to one another.

Figure 2:
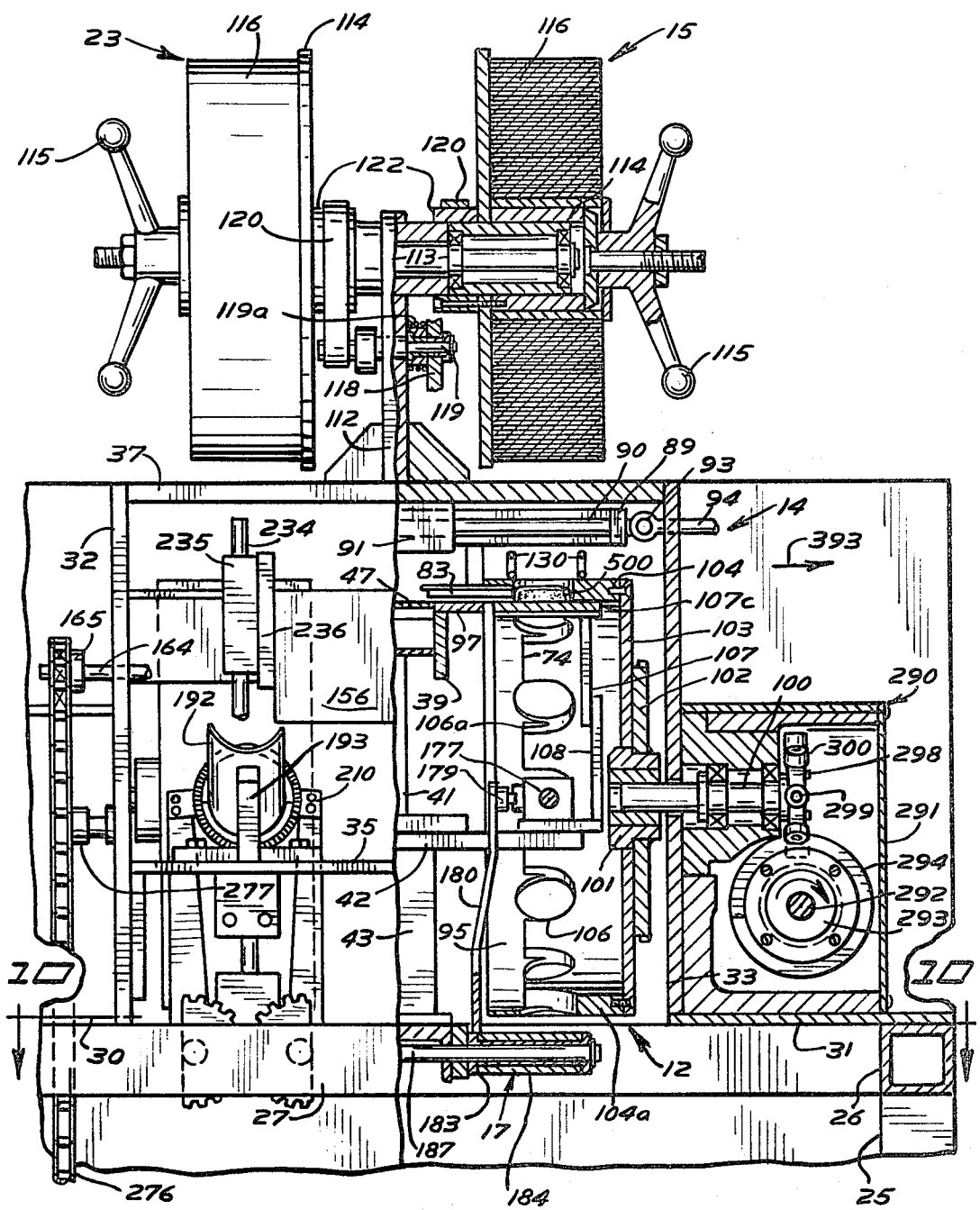
FIGURE 2 is in part a front vertical view of the left hand portion of the top part of the machine and in part a cross section view of the right hand top portion of the machine, said view being generally taken along the line and in the direction of the arrows 2—2 of FIGURE 1.
Figure 3:
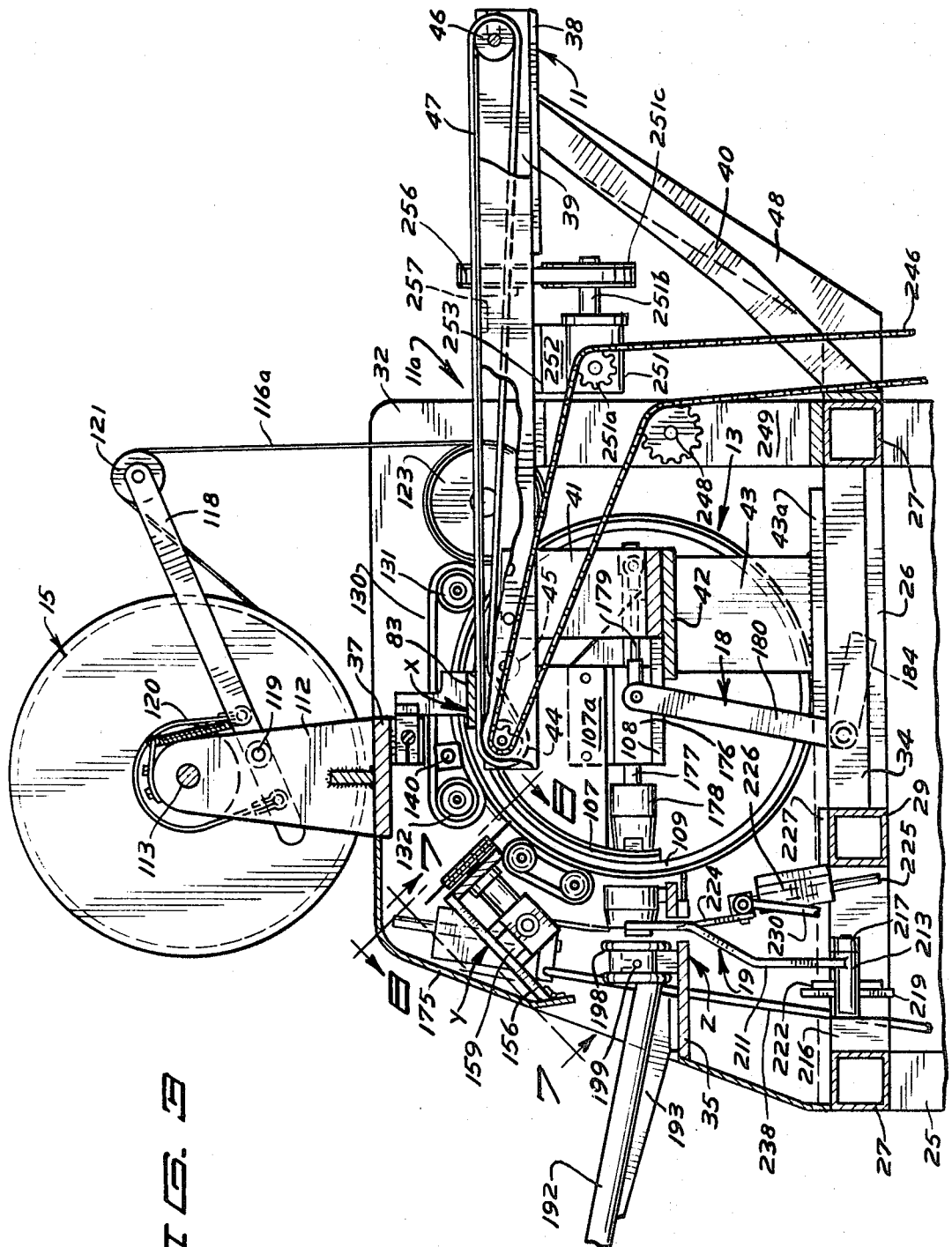
FIGURE 3 is a cross sectional view of the upper portion of the apparatus of FIGURE 1 with portions of a conveyor side rail being broken away, said view being generally taken along the line and in the direction of the arrows 3—3 of FIGURE 1.

The frame also includes a transverse mounting plate 35 that is secured at opposite ends to the upright plates 32, 33 and generally located vertically above the front transverse channel 27 (see FIGURES 2 and 3). A transverse mounting plate 37 is secured at its opposite ends to the upright plates 32, 33 adjacent the upper edges thereof and located above the channel 29. Other portions of the frame will be described hereinafter at the time that the structure mounted thereby is described.

*Infeed control and conveyor assembly (see FIGURES 1, 3 and 13).*—The infeed and control and conveyor assembly 11 includes a longitudinally extending conveyor 11a having a pair of longitudinally extending side rails 39 that are in part mounted in spaced relationship by a plate 38 attached to a channel 40 which at its lower end is secured to the rear transverse channel 27, and a bracket 41 which in turn is secured to the horizontal frame plate 42 located between plates 32, 33 and spaced therefrom. Frame plate 42 in turn is attached to a block 43 which at its lower end is attached to the longitudinal horizontal plate 43a. Plate 43 in turn is bolted to the channel 34 and located between drum assemblies 12, 13.

A driven roller 44 is mounted by the front end portions of side rails 39 and has a driven sprocket 44a keyed thereon (see FIGURE 14). Rearwardly of the driven roller is a tension roller 45 and at the rearward ends of the side rails is mounted an idler roller 46. A conveyor belt 47 is extended over rollers 44–46 which are mounted by the side rails as illustrated in FIGURE 3. As may be noted in FIGURE 3, the upper run of a belt 47 is vertically above the top edge of the rails 39.

To feed unwrapped mints onto the belt 47, there is provided a transversely extending conveyor assembly 49 that includes a driven roller shaft 49a having a sprocket 256 keyed on one end thereof to drive the belt 49b to move the upper run of belt 49b in the direction of the arrow 50 (see FIGURES 1 and 13). The opposite end of the conveyor 49 is positioned to receive mints from the main conveyor belt 51 which has the upper run thereof moved in the direction of the arrow 52. A bent channel 48 is bolted to a channel 26 for supporting the left end portion of the conveyor 49, while the opposite end of the conveyor 49 is attached to plate 38.

In order to selectively deliver unwrapped mints from the belt 51 onto the belt 49b there is provided a pneumatic operated gate assembly 54 (see FIGURE 1). The pneumatic gate assembly includes a gate 54a that is pivotally connected at 54b to a plate 54c that is attached to the adjacent side rail 49c of conveyor 49. Located within a housing 54e mounted by plate 54f which in turn is attached to a side rail 49c is a two way acting piston cylinder combination 54d that has the outer end of the piston rod pivotally connected to one end of the link 54g. The opposite end of the link is pivotally connected to the end of the gate which is located on the side opposite pivot 54b from the portions of the gate that is provided to extend over the conveyor 51. A spring member 54h is provided to bias the gate to the solid line position illustrated in FIGURE 1. Fluid lines (not shown) are connected to the cylinder of combination 54d and extend through a solenoid operated air control valve (not shown) for selectively operating the gate to move between the dotted line and solid line positions of FIGURE 1.

A diagonally extending guide rail 56 has one end attached to the side rail of conveyor 49 adjacent gate 54a and at opposite end is attached to the central portion of the opposite side rail so as to direct mints that are being moved by the upper run of belt 49b in the direction of arrow 59 to the slotted portion of the rail indicated by bracket 58. The lower portion of the rail forming the slot is spaced above belt 49b sufficiently so that a mint may pass therebeneath. A pair of curved, spaced guide rails 57 are mounted in overlying relationship to belt 49b and 47, rails 57 being spaced so that only a single mint may be advanced therebetween in sequence as they are moved by belt 47, 49b. A spacer plate 39a is mounted between each rails 57 and the respective side rail 39.

Spaced intermediate rails 57 and vertically above the belts 47, 49b at a distance slightly greater than the thickness of a mint is a horizontally curved hold down rail 60. A plurality of curved brackets 61 are at one end attached to one of the rails 57 and at the opposite ends supportingly mount the upper end of the spring mounting member 62 (see FIGURE 13). The lower end of the spring mounting members are attached to the rail 60 such that the rail 60 and the spring mounting member bolt can resiliently move in an upward direction in the event of an overly thick mint. The hold down rail extends from adjacent the slot 58 to adjacent one of the hold down bar 66 which is movably mounted above the upper run of the belt 47. To mount the bar 66 there is provided a pair of bent wires 67 which have the one ends thereof pivotally extended into the adjacent block 68. Blocks 68 are mounted in spaced relation on one of the side rails 39. The opposite end portions of the wires are extended into the adjacent end portions of the hold down bar 66 such that the bar may pivot relative thereto so as to vertically pivotally swing in one of the directions of the double arrow 70 about the pivotal connections to the blocks 68. As may be noted from FIGURE 13 the front end of the hold down bar adjacent conveyor 49 is curved to facilitate the passage of the mint thereunder. Further a stop bar 71 is extended beneath one of the wires 67 to limit the downward movement of the hold down bar to a predetermined distance above the upper run of the belt 47, bar 71 being attached to a rail 39 to extend thereabove. Further there is provided a spring 72 that is connected to a bent crank portion of the wire extended through the rearward block 68 and at the opposite end to the rail adjacent the opposite block 68 to resiliently urge the bar 66 to swing downwardly toward the belt 47.

The forward end of the bar 66 extends into the notch of the notched plate 76 of the drum infeed assembly 14, the plate 76 being bolted through blocks to the side rails 39 and extending transversely to adjacent the vertical circumferential edges of the drum assemblies 12 and 13 respectively. A stop block 80 is mounted on the rails 39 at a location substantially above the tension roller 45 and in overlaying relationship to the upper run of the belt 47, a stop plate 81 being mounted on the block. As may be noted from FIGURE 13 plates 76 and 81 are longitudinally spaced, and in part directly overhang the portion of the upper run of the belt 47 intermediate the ends of the rail 57 which are most closely adjacent the stop block 80. As a result of providing the block 80, the mints being carried on the belt 47 are prevented from being further moved therewith in a forward direction (arrow 52).

In order to selectively move a mint off the belt to alternately move a mint adjacent block 80 into the drum assembly 12 and then the next mint rearwardly into drum assembly 13, there is provided a plunger 83 that is secured to an upright block 84 in depending relation thereto (see FIGURE 13). The block 84 extends downwardly through the slot provided by plates 76, 81 to mount the plunger for reciprocal movement in the direction of the double arrows 85 (see FIGURE 1) in the space directly over the upper run of the belt 47 and intermediate the end of rails 57 and stop 80. Plates 76, 81 in part overhang plunger 83. A slide plate 97 is mounted on each side rail 39 to extend from adjacent to the respective shoulder 74 of drum assemblies 12 and 13 to the adjacent edge of belt 47 and in the plane thereof. The plates 97 are located directly beneath the path of movement of plunger 83.

The upper end of the block 84 is attached to a transverse slide bar 87 which in turn at its opposite end is attached to split clamps 89. Clamps 89 are clampingly retained on the slide rod 90 to move therewith, a portion of the rod intermediate said clamps being extended through a transversely apertured slide block 91 which is fixedly attached to the central portion of the frame member 37 to depend therefrom. The right hand end of the slide rod 90 is pivotally connected at 93 to one end of the connector rod 94 to be moved thereby. As may be noted from FIGURE 2, the transverse length of the plunger is such to extend from the vertical wall of the shoulder 74 of the one drum assembly to adjacent edge of the belt 47 and is of a vertical dimension to have one portion thereof underlie the adjacent portion of the annular flange 95 of said drum assembly. For example, if the aforementioned drum assembly 12, the rod 90 and the slide bar movable by the connector link 94 in a transverse direction (opposite arrow 393) by the connector link 94 to a position that the end of the plunger bar opposite that extended adjacent shoulder 74 of the assembly 12 will be located adjacent the corresponding vertical wall of the shoulder of the assembly 13 while the edge adjacent the shoulder of assembly 12 would then located in overhanging relation to the side rail 39 opposite that illustrated in FIGURE 2. Further the longitudinal width of the plunger is less than the diameter of the mint in order that it will only engage one mint at a time as it is moved from position such as illustrated in FIGURE 2 to the corresponding position with reference to assembly 13.

*Drum assemblies 12 and 13.*—Since the drum assemblies 12 and 13 are of substantially the same construction other than they oppositely faced as will be more apparent hereinafter, the description of said assemblies will primarily be directed to the drum assembly 12. Referring now in particular to FIGURES 2, 3, 5 and 6 the drum assembly 12 will now be described. The assembly 12 includes a transversely extending shaft 100 that extends through an aperture in the upright plate 33, an annular mount 101 being keyed to the end portion of the shaft located between plates 32 and 33. A gear 102 is welded to mount 101 while an annular plate 103 is rotatably mounted by mount 101 adjacent said gear. A slight angular adjustment of the plate 103 relative the gear 102 is provided by cap bolts (not shown) extended through arcuate slots in gear 102 and threaded into plate 103.

An axially elongated, annular drum member 104 at one edge is secured to the adjacent edge of plate 103 by cap screws. The drum member includes the aforementioned annular flange 95 which has a substantially greater inside diameter than the main body portion 104a of said drum member to form the previously mentioned annular drum shoulder 74. Further annular flange 95 is at the end portion of the drum member axially opposite plate 103.

A plurality of circumferentially spaced apertures 106 are provided in the drum member, said apertures being equally spaced and slightly closer to the annular edge opposite plate 103. Each of the apertures is of a slightly larger diameter than the diameter of the mint to be wrapped and in part extends through the flange portion 95 such as illustrated in FIGURE 2. Also a part of the drum portion 104a is milled away at 106a (see FIGURE 2) to provide a transverse, generally U-shaped slot with the dimension between opposite legs of the U being slightly greater than the diameter of a mint. Accordingly the opened end of the U-shaped slot 106a which is directly opposite plunger 83, permits entry of a mint therein when the plunger is operated while the web portion of said slot forms a stop whereby the mint is directly aligned with the aperture 106 extending radially outwardly through drum member 104. To permit the above, the radial dimension of the U-shaped slot portion is slightly greater than the thickness of the mint, aperture 106 in part being radially co-extensive with slot 106a.

To preclude a mint falling downwardly through the open bottom of the slot 106a after it is pushed off the edge of the slide plate 97 by plunger 83, there is provided a shroud 107 having a generally arcuate portion that extends through approximately 90° (see FIGURES 2, 3, 13 and 15). Even though FIGURE 3 shows assembly 13, the structure of assembly 12 would be the same as shown in FIGURE 3 if said figure was taken in the direction opposite arrows 3—3 of FIGURE 1. The generally arcuate portion 107c of shroud 107 which underlies the top aperture of the drum assembly is bent so as to be located slightly away from the inner peripheral wall of the assembly and thence as it extends angularly forwardly, it closely approaches the inner peripheral wall of drum portion 104a. The shroud also includes a vertical flange 107a that is bolted to the vertical flange of an angle bracket 108, bracket 108 in turn being bolted to one end portion of the mounting plate 42. An arcuate strip 109 extends from the forward edge of the stop 80 through an angle approximately 90° in the direction of rotation of the drum assembly and is secured to the arcuate portion of the shroud to be located closely adjacent to the shoulder 74 of the drum assembly and underlaying flange 95 to prevent a mint located within a U-shaped slot 106a moving transversely off of the shroud. That is, strip 109 is of a radial dimension substantially the same as that of shoulder 74.

Figure 15:
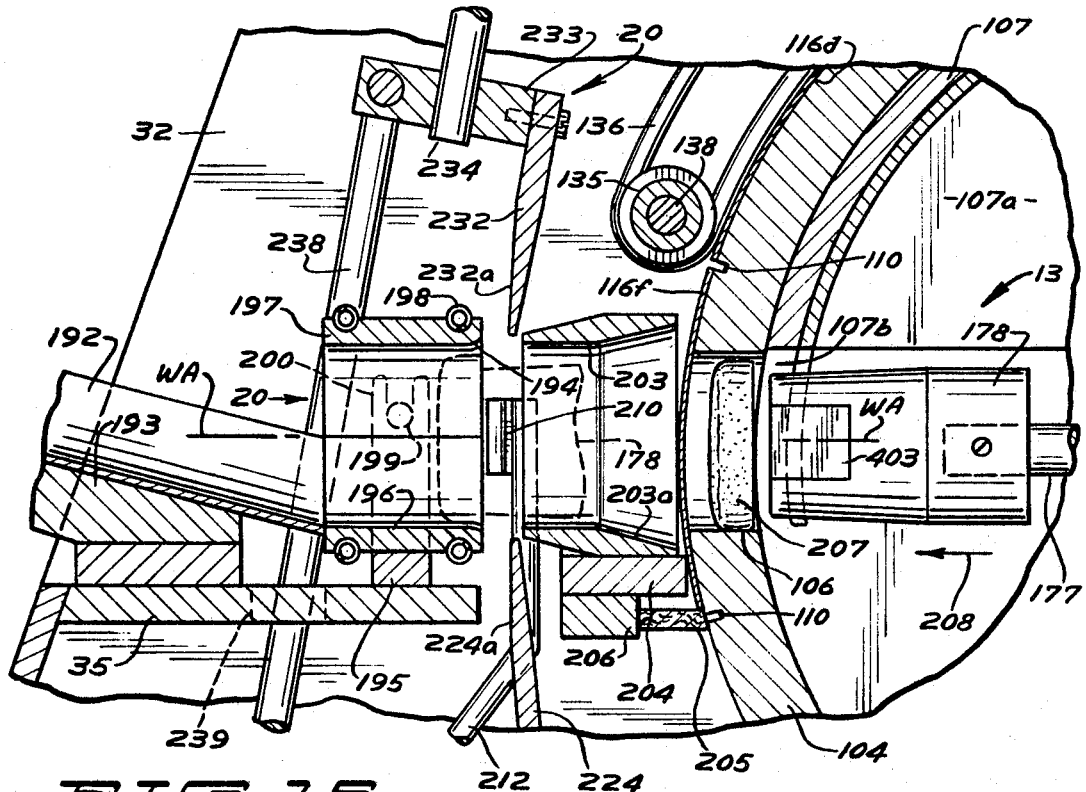
FIGURE 15 is an enlarged fragmentary cross sectional view generally taken along the line and in the direction of arrows 15—15 of FIGURE 1 to further illustrate the mechanism at the wrapping station for holding a wrapper about a mint, the thickness of the wrapper material being exaggerated.

The outer surface of the plate 103 and the drum member 104 includes a plurality of circumferentially spaced grooves 110, each groove extending the axial length of members 103, 104 (see FIGURES 5 and 15). There is provided a transverse groove 110 midway between each adjacent pair of apertures 106. The purpose of providing these grooves will become more apparent hereinafter.

The drum assembly 13 is of the same construction as that described with reference to the assembly 12 other than for the assembly 13, the plate 103 of assembly is located closely adjacent the upright plate 32, the U-shaped slots open toward assembly 12 and the shroud therefor is mounted on the opposite end of the mounting plate 42 from that described with reference to assembly 12. Further the assembly 13 includes its own drive shaft 100 which is extended through an aperture in plate 32 and is located on the opposite side of conveyor 11a from assembly 12.

*Web infeed hold down mechanism 15 and 23.*—Referring to FIGURES 1–3, first the web infeed portion of assemblies 15 and 23 will be described. The wrapper infeed portion includes an upright standard 112 that at its lower end is welded to the central portion of the transverse plate 37, the upper end of said plate mounting a web roller shaft 113 that extends transversely outwardly on either side thereof. A wrapper roll 114 is rotatably mounted on each end portion of the shaft 113 to rotate relative thereto, there being provided to roll securing handle member 115 for each roller to releasably retain a roll of continuous web wrapping material 116 on the respective wrapping roll 114.

For each wrapping roll 114 there is provided an elongated dancing roller arm 118 that is pivotally connected to the standard 112 by a pivot member 119 and is resiliently retained in the position illustrated in FIGURE 3 by a spring 119a. There is also provided brake mechanism 120 that is connected to the respective dancer roller arm and over a brake ring 122 that is rotatable on the shaft 113 and bolted to the wrapping roll 114.

Since the remaining portions of mechanisms are substantially the same other than mechanism 15 is mounted by plate 33 and mechanism 23 by plate 32 (except for the dancing rolls) for the most part only mechanism 15 will be described hereinafter. The continuous material of web material 116 on the wrapping roll 114 is extended over the dancing roll 121 which is rotatably mounted on the opposite end of the arm 118 and thence extends downwardly around the driven tensioning roll 123 to enter the nip between the tensioning roll and the drum assembly 12. The tensioning roll is keyed to a shaft 124 that extends outwardly through a bushing located in the upright plate 33 (see FIGURE 6). The opposite end of shaft 124 has rotatably positioned thereon, a pulley 125 that in turn has angular adjusting mechanism 126 bolted thereto, mechanism 126 in turn being keyed to shaft 124.

Figure 4:
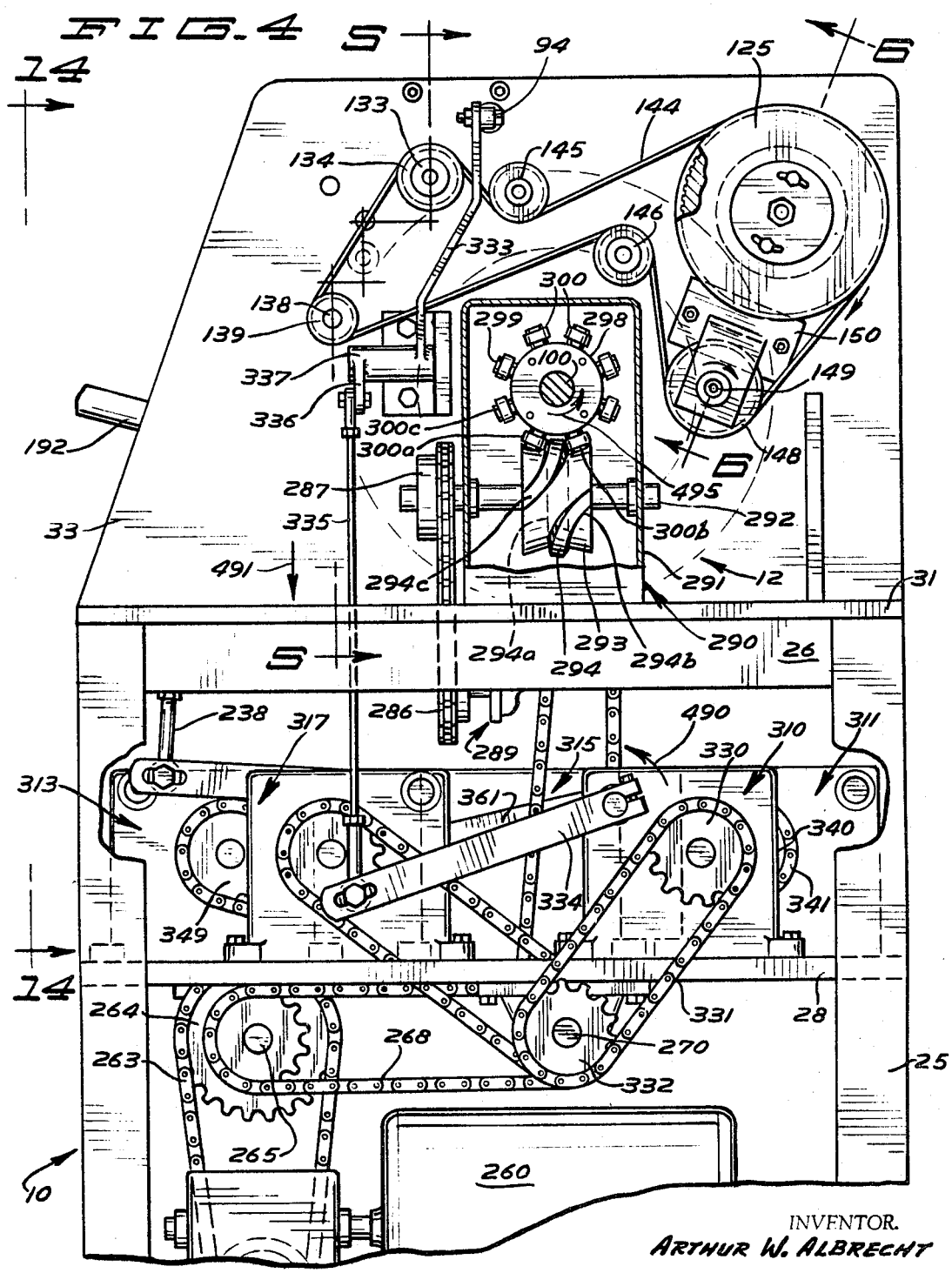
FIGURE 4 is a fragmentary right hand side view of the mint wrapping machine generally taken along the line and in the direction of the arrow 4—4 of FIGURE 1, a portion of the housing of the indexing cam mechanism being broken away.

The wrapper feed mechanism having been described, the wrapper hold down mechanism portion of assembly 15 will now be set forth (see FIGURES 3, 4 and 5). The wrapper hold down mechanism includes a pair of transversely spaced O-rings 130 which are extended around the grooved portions of idler roll 131 and drive roll 132 respectively such that the lower runs of the O-rings will bear against a substantial, adjacent exterior arcuate portion of the drum assembly 12, provided there is no web material therebetween. Also as may be noted with reference to FIGURES 2 and 3, the O-rings 130 extends over substantial arcuate portions extending angularly on either side of the plunger slide 97. The roll 131 is rotatably mounted on a stud shaft secured in the upright plate 33 while the roll 132 is keyed to one end portion of the driven shaft 133 that rotatably extends through the wall 33. The opposite end of shaft 133 has a driven pulley 134 keyed thereto (see FIGURE 5).

Located angularly in advance of the driven roll 132 in the direction of rotation of the drum assembly 12, but angularly rearwardly of the 90° position thereof, is a grooved idler roll 134, and angularly in advance thereof, a driven groove roll 135, said rolls mounting four transversely spaced O-rings 136 such that one run of each of said rings will bear against a substantial arcuate portion of the drum assembly 12 when there is no web material at this location. The idler roll 134 is rotatably mounted on the shaft 137 which is secured to plate 33 while the roll 135 is keyed to one end portion of the shaft 138 which is rotatably extended through the upright plates 33. A driven pulley 139 is keyed to the opposite end of said shaft 138.

A rod 140 is mounted by plate 33 to overhang the drum assembly 12, said rod mounting a plurality of spaced fingers 141 that extend downwardly and forwardly beneath the roll 132 (see FIGURES 3, 5 and 7) for retaining the web in abutting relationship with the drum assembly after it has passed beneath roll 132.

In order to drive the O-ring rolls there is provided a timing belt 144 having a notched inner surface (the notches not shown). The timing belt is extended around the pulley 125 with the notched portions thereof in engagement with the counter part notch portions of said pulley, then beneath an idler roll 145 mounted on plate 33, thence over the drive pulleys 134, 139 with the inner surface of the belt in contact with said pulleys, next over an idler pulley 146 which is rotatably mounted on the upright plate 33; and finally over the drive pulley 148 and back to pulley 125 (see FIGURE 4). The drive pulley 148 is keyed to a drive shaft 149 which at one end is rotatably mounted in bracket 150 that is secured to the upright plate 33 (see FIGURE 6). An intermediate portion of shaft 149 extends through plate 33 while the opposite end has a spur gear 151 keyed thereto in meshing relationship with the spur gear 102. As a result of the aforementioned drive connections, the O-rings 130, 136 and roll 123 for drum assembly 12 is driven only when this drum assembly is being rotated, there being no slippage due to the provision of the notched timing belt and the notched pulleys 125, 133, 138 and 148. Likewise since corresponding structure is mounted by plate 32 (except the dancing roll 123) adjacent drum assembly 13, the web hold mechanism associated therewith being driven only when the assembly 13 is being rotated.

*Wrapper cut off assembly 16.*—Referring to FIGURES 3 and 7–9 inclusive, the wrapper cut off assembly includes a transversely extending cross piece 155 that is at its opposite end secured to upright plates 32 and 33 respectively. The cross piece is located angularly between roll 134 and fingers 141 but closely adjacent the roll 134 and angularly rearwardly thereof. A mounting plate 156 of a substantially smaller transverse length than cross piece 155 is at one edge welded to the upper edge of the cross piece to extend downwardly and forwardly of said upper edge. Angle gear devices 157 and 158 are bolted to the mounting plate in depending relation thereto by bolts 160 extended through bolt receiving apertures in said devices, mounting blocks 159 and thence through the mounting plate 156. The devices are mounted to have their output shafts 157b, 158b respectively extend parallel to one another, rearwardly through the cross piece 155 and have sprockets 161, 162 keyed to the respective shaft. The device 157 includes a shaft 157a that is drivenly connected to shaft 157b through beveled gears (not shown), one end of the shaft 157a being connected to the adjacent end of the drive shaft 164 through a coupling 165. The opposite end of shaft 157a is connected through a coupling 166 to drive the shaft 158a of the device 158, the device 158 including beveled gearing for drivingly connecting the shaft 158a to the shaft 158b. The shaft 164 extends outwardly through a bushing 32a in plate 32 and in its outer end has a sprocket 165 keyed thereto.

A link chain 169 is extended around a sprocket 162 keyed on shaft 158b and an idler sprocket 167 which is rotatably mounted on stud shaft 168 closely adjacent the upright plate 33. Stud shaft 168 in turn is mounted by cross piece 155. A second stud shaft 168 is mounted on cross piece 155 for rotatably mounting a second idler sprocket closely adjacent upright plate 32, there being a chain 170 extended around said second idler sprocket and a sprocket 161 keyed on shaft 157b. By the aforementioned structure, chain 170 is mounted to have its lower run extend transversely across drum assembly 13 angularly intermediate O-ring rolls 134 and O-ring rolls 132. On knife 171 which may be a sharp piece of steel is mounted a bracket 172 on a link of chain 170 while a corresponding bracket mounts a knife 173 on a link of chain 169. The knives are synchronized with the drum assemblies such that the knife 171 will be extended into and moved through slot 110 therebeneath of the drum assembly 13 when said assembly is stopped; and the knife 173 will be drawn through the radially adjacent slot of the drum assembly 12 when said assembly is stopped. The synchronism and the purpose for providing the knives will become more apparent hereinafter.

A cover 175 is pivotally connected to the lower end of the plate 156 and is extended upwardly and then rearwardly to the transverse cross piece 37. The cover is of a transverse dimension to extend between the upright plates 33 and 32.

*Plunger sub assemblies 17 and 18.*—Since the plunger assemblies 17 and 18 are of substantially the same construction, other than the crank arm of one is bent to extend into the drum assembly 12 and the other is bent to extend into drum assembly 13, the plunger assembly 18 which is associated with the drum assembly 13 will be described. Referring now to FIGURES 2, 3 and 15 (FIGURES 2 and 15 showing assembly 17) the plunger assembly 18 includes a slide block 176 mounted on the horizontal leg of angle bracket 108, said slide block slidably mounting the intermediate portion of the plunger rod 177 so that it extends horizontally and along a diameter of the drum assembly 13 to be translated only in a horizontal direction (on wrapping axis WA—WA). The elongated axis of the plunger rod is located in a vertical plane that passes through the diameters of the apertures 106 of the assembly 13. Mounted on the forward end of the plunger rod is the plunger 178, the maximum diameter of the plunger being slightly less than the diameter of an aperture 106 and of a diameter to pass through the U-shaped cut out 107b at the angularly forward edge of the shroud 107 (see FIGURE 15). Further the forward end portion of the plunger is generally frustoconical and has a minor base at the forward end thereof.

The rearward end of the plunger rod is pivotally connected to one end of an adjustment connector link 179, the opposite end of said link being pivotally connected to the upper end of the crank arm 180. As may be noted from FIGURE 2 of assembly 17, the crank arm 180 is bent so that the upper end portion thereof is axially located within the confines of the drum member 104 of assembly 12 while the lower end portion is located transversely outwardly thereof.

The lower end of the crank arm is welded to one end of a transverse tube 182 which in turn is rotatably mounted on the bushing 183 (see FIGURES 2 and 11). A radially extending arm 184 is welded to the opposite end of tube 182 such that it extends at substantially right angles therefrom relative the arm 180.

The plunger assembly 17 includes the structure described with reference to assembly 18, the plunger rod of subassembly 17 being located such that the elongated axis thereof is in a plane passed through the diameters of the apertures 106 of the drum assembly 12. The various member and connections for assembly 18 may be considered left hand while those for assembly 17 as right hand since the drum assemblies are oppositely faced.

In order to mount the tubular members 182 of assemblies 17, 18 for independent movement, there is provided an elongated shaft 187 (see FIGURES 2 and 11). The tube 182 of assembly 17 is pivotally mounted on a bushing 183 at one end of the shaft 187 while the corresponding structure for assembly 18 is mounted on the opposite end of said shaft with the crank arms 180 being more closely adjacent one another than the radial arms 184. The portion of the shaft 187 between tubes 182, 182 is mountingly extended through apertures in the depending legs of the channel 34. A spacer 189 is provided on the shaft 187 between each tube and adjacent channel leg.

*Folder assemblies 19 and 20.*—Referring now to FIGURES 2, 3, 14 and 15, the structure of the folder assemblies 19 and 20 will be set forth. Since the folding assemblies 19 and 20 are respectively associated with the drum assemblies 12 and 13 of the same construction, primarily only the structure of the assembly 20 will be set forth. The assembly 20 includes an outlet choke sub-assembly having a mounting block 195 bolted to the rear portion of the frame cross piece 35, semi-tubular member 196 being welded to the mounting block to extend upwardly therefrom in axial alignment with the lower half of the plunger 178. A corresponding semi-tubular member 197 is positioned on tubular member 196, said members 196, 197 enclosing a generally cylindrical shape and having a central axis along WA—WA. A pair of axially spaced coil springs 198 are provided in the grooves in the outer surface portions of members 196, 197 to resiliently retain them in a juxtaposition, however, permitting tubular member 197 being elevated and pivoted relative to tubular member 196 in the event that a mint being moved in therethrough is of a larger diameter than the inside diameter of the semi-tubular members in abutting relationship such as shown in FIGURE 15. The inner peripheral wall of tubular members 196, 197 is flared at 194 in an outward direction at the end adjacent the plunger 178 to facilitate the movement of a mint thereinto.

Further to permit semi-tubular member 197 moving upwardly relative to member 196 but still retain it against longitudinal movement, diametrically opposed outwardly extending studs 199 are welded to member 197. Each of the studs extends through an upwardly opening slot provided in the upper end portion of the respective stud supporting bar 200. The lower ends of the stud mounting bars are welded to the mounting bar 195. A chute 192 which is semi-circular in cross-section is mounted by a chute mount 193 to extend upwardly and forwardly of the outlet of the choke subassembly in order to receive wrapped mints therefrom. The mount 193 is bolted to cross piece 35.

In order to make the initial generally horizontally rearwardly extending fold in the cut piece of web 116f that forms the wrapper for the mint, there is provided a folding tube 203 that is mounted to be axially aligned with the plunger (wrapper axis WA—WA) and the outlet choke subassembly and to have the rearward edge thereof closely adjacent the drum assembly 13. The forward axial edge of tube 203 is spaced a substantial distance rearwardly of the choke subassembly but less than the thickness of a mint to be wrapped. The folding tube has a bore 203a that is of a substantially constant diameter at the forward end portion thereof and which flares outwardly and rearwardly in a direction toward the plunger 178, the constant diameter portion of the bore being slightly larger than the diameter of the mint that is to be passed therethrough. The folding tube is mounted on a frame cross bar 204 that extends between and at opposite ends is secured to the upright plates 32, 33.

In order to hold the wrapper 116f such that substantially the same size portion thereof extends upwardly above the folding tube as that extends below the folding tube, there is provided a brush 205 that is mounted by a brush block 206. The brush block is dependingly secured to the mounting bar 204 such that the brush extends generally horizontally and bears against the annular drum member 104 directly beneath the aperture 106 located at a 90° position of the drum assembly 13.

After the drum assembly 13 has been indexed to a position that an aperture 106 is intermediate the plunger 178 and folding tube 203, and with the mint 207 in said aperture and the wrapper 116f being supported by brush 205, the drive mechanism, which will be described hereinafter, moves the plunger 178 of the drum assembly 13 from the solid line position of FIGURE 15 (in the direction of arrow 208) to the dotted line position of said figure such that the mint is pushed into the flared mouth 194 of tubular members 196, 197. As a result of the mint being pushed through the folding tube, the outer perimetric portions of the wrapper 116f are folded backwardly over the generally circumferential edge of the mint to extend in a rearward horizontal direction, and with the mint located in the dotted line position of FIGURE 15, said perimetric portions will extend into the constant diameter portion of the folding tube.

In order to complete the folding of said perimetric portions along the back side of the mint there are provided a pair of side folders 210 that are located out of, but in position to move in opposite directions into the clearance space between the outlet choke and the folding tube. The adjacent generally vertical edges of the side folders are curved, the side folders in a datum condition being spread sufficiently apart to permit the passage of the mint therebetween and thence movable to partially fold the wrapper 116f therebetween so portions thereof extend transversely.

The right hand side folder 210 is mounted on the upper end of the arm 211 while the other side folder 210 is mounted on the upper end of arm 212. Each of these arms has the intermediate portion bent such as illustrated in FIGURE 3 for assembly 19 to clear the cross piece 35, the lower end of each arm being welded to one axial end portion of tube 213 to extend radially outwardly therefrom. To the opposite axial end portion of tube 213 for arm 211 is welded one end of a radial arm 214.

The tubes 213 for the assembly 19 are each pivotally mounted on parallel stud shafts 217 such that the segmented spur gears 218 and 219 are positioned in intermeshing relationship. The gear segments are mounted on the respective tube 213 for limited angular adjustment by a member 222 that is welded to the respective tube and has bolts extended through arcuate slots therein which in turn are threaded into the respective gear segment. As a result providing gear segments 218, 219, when the arm 211 is pivoted about its stud shaft in the direction of the arrow 220, the arm 212 is caused to pivot an equal angular amount in the opposite direction (arrow 221) so that the folders 210 are moved in a vertical plate to a position more closely adjacent one another. The stud shafts 217 for each assembly 19 and 20 are secured to a block 216 which in turn is secured to the front upper channel 27.

In order to fold the bottom horizontally extending perimetric portion of wrapper 116f upwardly, there is provided a bottom folder 224 having a clamp at the lower end for clampingly attaching it to the upper end of the slide rod 225. The slide rod is extended downwardly through an apertured guide block 226 which in turn is attached to an angle bracket 227 that is mounted on the transverse channel 29. The guide block extends at an angle approximately 10° such that when the folder rod 225 is reciprocated therein, the folder 224 moves upwardly into the space between the choke subassembly and the folder tube at an angle about 10°. The folder 224 has a generally vertical surface 224a that abuts against the wrapper as it is moved upwardly and thereby forces the mint in the mouth 194 of the choke subassembly further into the interior of the choke subassembly. In order to reciprocate folder 224, an adjustment rod is pivotally connected to the bottom folder clamp to depend therefrom.

In order to fold the top horizontally extending perimetric portion of the wrapper 116f downwardly, there is provided a top folder 232 that is mounted at an angle to extend downwardly and forwardly, said top folder having a generally vertical surface 232a that abuts against the wrapper as the folder is moved in a downward and forward direction to further force the mint further into the choke subassembly as said surface is moved adjacent the mouth of the outlet choke subassembly associated with assembly 13. Folder 232 is secured to one end of the longitudinally elongated clamp 233 to depend therefrom, the central portion of the clamp being secured to the lower end of the slide rod 234. The slide rod extends upwardly through a guide block 235 which in turn is secured to a bracket 236 (see FIGURES 6, 7 and 14). The bracket 236 in turn is welded to the left edge of the cut off plate 156. To be mentioned is that the guide block 235 for the assembly 19 is likewise mounted by a bracket 236 except that the last mentioned bracket is welded to the right edge of the plate 155 (one more closely adjacent the upright plate 33). The apertures of the guide blocks 235 extend at approximately a 10° angle in a forwardly and downwardly direction so that the top folders likewise move at such an angle to the vertical when the slide rods are reciprocated in said guide block.

Again referring to folder assembly 20, said assembly includes a rod 238 that at its upper end is bent inwardly, the bent end being pivotally secured in the opposite end of the clamp 233. Rod 238 extends downwardly through aperture 239 in the cross plate 35. The rod 238 for the assembly 19 is of the same shape other than it is a right hand rod rather than a left hand rod, and accordingly the depending portion thereof is located closely adjacent the upright plate 33.

In order to drive the conveyor belt assemblies, a motor 242 is mounted on the motor mounting plate 243 which in turn is mounted on frame pieces 28 to extend outwardly therefrom (see FIGURE 10). A drive sprocket 245 is mounted on the reducer shaft of the reducer 244 which is driven by motor 242, said sprocket driving the chain 246 which has one run extended over the idler sprocket 248. The idler sprocket is rotatably mounted on the center portion of the bracket 249 which extends between the intermediate rear channel 26 and the central portion of the conveyor 11a. The chain thence extends around sprocket 44a (see FIGURE 14) that is drivingly connected to the roller 44 to drive conveyor belt 47 and thence over one sprocket of the angle gear 251. The chain then extends downwardly to sprocket 245.

Angle gear 251 is bolted to a mounting block 252 which in turn is dependingly secured to a cross plate 253 that extends between and transversely outward of one rail 39, and is secured to the side rails 39. The angle gear includes internal beveled gearing (not shown) that is driven by sprocket 251a and a driven shaft 251b which has a spur gear 251c keyed thereto (see FIGURES 10 and 13). Thus the axis of rotation of gear 251a is at right angles to the axis of rotation of the spur gear 251c. Spur gear 251c drives the spur gear 256 which is keyed to the outer end of the shaft 49a of the roller over which the belt 49b is extended to drive said belt. That is the roller shaft is extended through side rails 49c and the depending flange of the angle bracket 257. Bracket 257 is bolted to another bracket (not shown) which in turn is welded to plate 253.

In order to drive the remaining operating members of the apparatus of this invention, a motor 260 is drivenly connected to a reducer 261 to drive the sprocket 262 which is keyed to the reducer output shaft, the motor and reducer being mounted on frame member 259 (see FIGURES 10 and 12) which in turn is mounted by lower frame members 27. The sprocket 262 through chain 263 drives the sprocket 264 which is keyed to the intermediate portion of the main drive shaft 265. The main drive shaft 265 in turn is supported in depending relation from the two longitudinal cross pieces 28 by bearing mounts 266 which are bolted thereto.

Keyed on shaft 265 to be driven thereby is a sprocket 267 that through chain 268 drives sprocket 269 which is keyed to the secondary drive shaft 270 which is journaled for rotation by bearing mounts 273 that are dependingly bolted to cross pieces 28. A hand wheel 270a is keyed to shaft 270. Also keyed to the main drive shaft 265 is a sprocket 274. A chain 275 is extended around sprocket 274, upwardly through slot 278 in the base plate 30, and around sprocket 165 of the cut off assembly (see FIGURE 8) to drive the shaft 164. One run of chains 275 is extended over the idler sprocket 277 that is rotatably mounted on the upright plate 32.

A sprocket 280 is keyed to the secondary drive shaft to drive chain 281 that is extended around a sprocket 283 of the angle gear device 285. The device 285 in turn is bolted to the base plate 31 through a mount 284 to be in depending relation thereto. Device 285 includes a second sprocket 285 which through internal connections (not shown) of a device 282 is driven by gear 283. Sprocket 285 drives a chain 286 which in turn drives the sprocket 287 of the roller gear drive, generally designated 290.

Roller gear drive 290 is mounted on the base plate 31 and is provided for drivingly indexing the drum assembly 12. A second roller gear drive assembly, generally designated 288 is provided for indexingly driving the drum assembly 13 and is mounted on the base plate 30. The sprocket 287 of roller gear drive 288 is driven through a second set of elements 280–286 inclusive through the rotation of the secondary drive shaft 270. In this connection it is to be noted that the angle gear drive 282 for drive 288 is rotated at 180° about a vertical axis from the angle gear drive for assembly 290 and that the two sprockets 280 are substantially axially spaced from one another.

Since the roller gear drives 288, 290 are substantially of the same construction, the structure of drive 290 will be set forth with reference to FIGURES 2, 4 and 5. Drive 290 includes a housing 291 that journals a shaft 292 for rotation, one end portion of said shaft extending outwardly of the housing and having the sprocket 287 keyed thereto. Located within the housing and keyed to shaft 292 is a cam 293 having a cam track 294. The cam track is shaped substantially as illustrated in FIGURE 4, the portion 294a of the cam track on the back side of the cam 293 as viewed in said figure being of a shape not to vary axially relative to the very top portion and the very bottom portion of said track with the cam in the FIGURE 4 position. Track 294 includes portion 294c that is curved axially in one direction and portion 294b curved axially in the opposite direction.

Journaled in the housing for rotation about a horizontal axis that extends perpendicular to a vertical plane containing the axis of rotation of the shaft 292 is the drum shaft 100. Shaft 100 extends through an aperture formed in the plate 33 and has the mount 101 for the assembly 12 keyed thereto (the shaft 100 for the assembly 288 being extended through a corresponding aperture in plate 32 for mounting the mount of the drum assembly 13). Keyed to the shaft 100 to be located directly above the cam is a cam follower that includes an annular mount 298 which in turn mounts a plurality of radially extending stud shafts 299 that are equally angularly spaced from one another. On each stud shaft there is rotatably mounted a roller 300. Each adjacent pair of rollers has adjacent circumferential surfaces spaced a distance slightly greater than the maximum axial width of the cam track 294 and located so that the lowermost pair of rollers will engage said cam track. Although only eight rollers are illustrated in FIGURE 4, it is to be understood that if the drum assemblies have twelve apertures 106 such as indicated herein, then twelve rollers would be provided on each annular mount (only eight rollers may be shown to facilitate the illustration thereof). Since the roller gear drives are of conventional construction, such as "E" series of Ferguson Machine and Tool Co. of St. Louis Mo., the structure thereof will not be further described.

Through the structure previously described, the shafts 292 are continuously driven; however shafts 100 are only rotated during the portion of the rotary cycle of shafts 292 that rollers 300 engage portions 294c, 294b of the cam track 294 that are curved in the direction of the axis of rotation of shaft 292 while during the remaining portion of the angular movement of shafts 292, shafts 100 remains stationary to provide a dwell for the respective drum assembly (dwell during the time the rollers engage track portion 294a).

In order to properly sequentially operate the various other operating elements of this invention, it will be noted in referring to FIGURES 4 and 10–12 inclusive there are provided a plurality of cam assemblies, each indicated by its general designation as follows: an infeed plunger cam assembly 310, wrapper plunger cam assemblies 311 and 312, side fold cam assemblies 313 and 314, bottom fold cam assemblies 315 and 316, and top fold cam assemblies 317 and 318 respectively. The cam assemblies 310–318 are bolted to the various longitudinal frame plates 28 such as illustrated in FIGURE 10.

The cam assembly 312 (see FIGURES 17 and 18) includes a generally box shaped housing 321 having a cam shaft 322 journaled for rotation in the central portion of the side walls thereof. One end of the cam shaft extends outwardly of the housing for mounting a sprocket as will be set forth hereinafter.

A follower shaft 326 is rotatably mounted by one side wall of the housing such that one portion extends outwardly of the housing for mounting an arm as will be described hereinafter. Clamped to the portion of the shaft extending within the housing is a radially extending arm 327, the outer end of said arm rotatably mounting the roller 328 to ride in the cam track 324 of the cam 323. As may be noted from FIGURE 18, the cam track has a circumferential portion 324a of a constant radius to provide a dwell period and a portion 324b of varying radii to cause the roller 328 and thereby the arm mounted on the follower shaft to be pivotally moved as the cam is rotated through 360°. The sequence of movement of the arm on the cam follower shaft 326 for 360° revolution of the cam shaft is indicated by the curve 324a, 324b of FIGURE 19.

Since cam assemblies 310, 311 and 313–318 inclusively are generally of the same construction as cam assembly 312 they will not be further described other than it is to be noted from FIGURES 10–12 that some of cam shafts extend outwardly through the side wall opposite that illustrated in FIGURES 17 and 18, that the follower shafts of some cam assemblies are located in the opposite upper corner portion of the housing and others in the opposite side wall corner portions of the housing, that the direction in which the cam track faces depends upon the relative relationship of the direction of extension of the follower shaft to the cam shaft, and that the shape of the cam tracks are varied to provide the sequential movement of the arm on cam follower shaft such as indicated in FIGURE 19 for the various cam assemblies.

The structure for reciprocating the mint infeed plunger 83 includes the cam assembly 310 which has a sprocket 330 keyed on the cam shaft thereof, sprocket 330 being driven by a chain 331 that is extended around a sprocket 332 keyed to the secondary drive shaft 270. Clamped to one end of the follower shaft of assembly 310 is a radially extending arm 334, the opposite end of said arm being pivotally connected to one end of an adjustment connector link 335 by a bolt extended through a radially elongated slot in said arm (see FIGURES 4 and 5). The connector rod extends generally vertically upwardly through a slot formed in the base plate 31 and has the opposite end thereof pivotally connected to the outer end of the radial arm 336 which at its inner end is welded to the tube 337. Tube 337 is pivotally mounted on a shaft 338 which in turn is mounted by one leg of the angle bracket 339. The other leg of the angle bracket is bolted to the upright plate 33.

A second radial arm 333 is welded to the tube 337 to extend angularly outwardly therefrom at an angle at about 90° relative arm 336. The outer end of arm 333 is pivotally connected to the adjustment rod 94, the adjustment rod extending through an aperture 339 at the upper central portion of plate 33. The opposite end of rod 94 is connected to the slide rod 90 as described with reference to FIGURE 2. In this connection it is to be noted that the position of the connector link 94 of FIGURE 2 is the same as illustrated for the dotted line position of radial arm 333 in FIGURE 5. The structure for operating the wrapper plunger 178 of the drum assembly 13 includes the cam assembly 312 which has a sprocket 340 keyed to its cam shaft. The sprocket 340 is driven by chain 341 which extends around a sprocket 342 that is keyed to the secondary drive shaft 270 (corresponds to that illustrated for cam assembly 311).

An arm 344 is at one end clamped to the cam follower shaft of assembly 312 to extend radially therefrom, the opposite end of said arm being pivotally connected to the lower end of an upwardly extending adjustment connector link 345. The aforementioned connection is made by a bolt being extended through an elongated slot in the arm 344. The upper end of link 345 is pivotally connected to the outer end of the arm 184 (upper left side of FIGURE 11). The structure for operating the plunger 178 associated with the drum assembly 12 is the same as that described with reference to the plunger associated with assembly 13 other than the cam assembly 312 is a left hand assembly while that of assembly 311 which is associated assembly 12 may be considered a right hand cam assembly.

For sequentially moving each pair of side folders for the drum assemblies 12 and 13, there is provided the cam assemblies 313 and 314 respectively. A sprocket 349 is keyed on cam shaft of assembly 313 and driven by a chain 350, chain 350 in turn being drivenly extended around sprocket 351 which is keyed on the secondary drive shaft 270. One end of the short radial arm 353 is clamped to the outer end of the cam follower shaft of assembly 313, the opposite end of said arm being pivotally connected to adjustment connector rod link 354 by a pivot bolt extended through a radially elongated slot in arm 353. The link 354 is pivotally connected to the outer end of arm 214. The cam assembly 314 is driven, and sequentially operates the pair of side folder arms for the drum assembly 13 through the structure such as described with reference to cam assembly 313. It is to be noted that assembly 313 may be considered a right hand assembly while assembly 314 a left hand assembly and that the drive connections to and from assembly 314 are accordingly of a proper construction to operate the side folder arms for drum assembly 13.

For operating the bottom folders associated with the drum assemblies 12 and 13 respectively, there is provided cam assemblies 315 and 316. The cam shaft of assembly 315 has a sprocket 358 keyed thereon which is driven by chain 359, said chain in turn being driven by a sprocket 360 keyed on the secondary drive shaft 270. One end of elongated arm 361 is clamped to the cam follower shaft of assembly 315 to extend radially therefrom, the opposite end being pivotally connected to the lower end of the adjustment connector link 230 by a bolt extended through the radially elongated slot (not shown) of arm 261. The structure for sequentially operating and driving the cam assembly 316 to operate the bottom folder associated with drum assembly 13 corresponds to that described with reference to assembly 315 other than some parts are left hand parts instead of right hand since assembly 316 may be considered the left hand assembly while assembly 315 may be considered a right hand assembly.

In order to sequentially operate the top folders that are associated with drum assemblies 12 and 13 there are provided cam assemblies 317 and 318 respectively. The assembly 317 has a sprocket 364 keyed on its cam shaft to be driven by chain 365. Chain 365 in turn is driven by a sprocket 366 keyed on the secondary drive shaft 270. One end of an elongated arm 367 is clamped on the cam follower shaft of assembly 317, the opposite end being pivotally connected to the lower end of the adjustment rod 238 by a bolt extended through the radially elongated slot (not shown) in arm 367. The structure for sequentially operating the top folder associated with drum assembly 13 corresponds to that described with reference to cam assembly 317 other than that the elements are modified in view of the fact that the assembly 318 may be considered a left hand assembly and assembly 317 a right hand assembly.

For each cam assembly, either the sprockets on the cam shaft, or the sprocket on the secondary drive shaft from which the respective cam shaft sprocket is driven includes a limited angular adjustment of a conventional construction in order to facilitate the timing of the structure operated by one assembly to the other assembly.

The electrical controls and electrical components, generally designated 22, include power supply lines 375 that are connected to an on and off switch 376 to the main lines 377 and 378 respectively (see FIGURE 21). Line 377 is provided with junctions 379, 380 and 381; while line 378 is provided with junctions 382, 383 and 384. Connected across junctions 379 and 382 is the control potentiometer 385 for operatively controlling the speed of the D.C. motor 242 which is connected thereto.

Connected across juctions 380 and 383 is the main potentiometer 386 for the D.C. motor 260. The potentiometer 386 includes terminals 387, 388 and 389, there being a slow potentiometer 390 connected across terminal 389 and contact 391 of the solenoid operated relay 392. The relay 392 includes a solenoid coil 394 that is connected across junctions 381 and 405. The relay also includes a contact 437 that is connected to terminal 388 by line 393, a contact 438, and a movable switch member 397 that in solenoid de-energized condition connects contacts 437, 438; and in an energized condition connects contacts 391 and 438.

Contact 438 is connected to the stop switch terminal 395 by a line 398 of stop switch 396. Switch 396 also includes a second terminal 399 that is connected by line 400 to terminal 387, there being provided a movable switch member 401 for alternately making contact between terminals 399 and 395 and providing an open circuit between said terminals. Switch member 401 is resiliently retained in an open condition but upon a mint being moved by belt 47 in the direction of arrow 52 against the pivotally mounted wire 397 of switch 408, the further movement of the mint pivots the outer end of said wire upwardly. In this connection, the wire has the outer end portion extended across the patch of movement of the mint such that the mint moving thereagainst will pivot the wire upwardly and thence pass therebeneath. The wire 397 is operatively connected to switch member 401 to move it to a closed position while the mint passes beneath the wire, said switch member and wire being resiliently urged to a switch member open condition upon the mint passing out of contact with the wire.

Junction 405 is connected by a line 406 to junction 412 which in turn is connected via line 413 to a terminal 407 of the slow down switch 408. Switch 408 includes a second contact 409 that is connected by a line 410 to junction 384. There is provided a switch member 411 normally in an open position but in a closed position electrically connects contacts 407 and 409. The switch member 411 is operatively connected to a wire 414 of switch 408, said wire being pivotally mounted to have the outer end portion extend across the path of movement of a mint by belt 47 similar to that described with reference to wire 397. Accordingly, a mint passing beneath the outer end portion of wire 414 will result in switch member 411 being moved to an open condition, said switch member being resiliently urged to a closed position after the mint has passed beneath the wire. As may be noted from FIGURE 13, switch 408 is mounted on conveyor 11a a substantially greater distance from the drum assemblies than switch 396, the switch 396 of said figure being shown in a closed condition and switch 408 in a closed condition.

The solenoid coil 415 of the solenoid operated timer 416 is connected across junctions 381 and 412. The timer 416 includes a contact 420 that is connected to junction 384 by a line 421, and a contact 422 that is connected by line 423 to contact 424 of the solenoid operated relay 392. The timer also includes a movable switch member 428 that in a solenoid de-energized condition connects contacts 420 and 422; and in a solenoid energized condition connects contacts 422 and 429 which is a blank contact. The timer is of a construction that it is immediately energized upon the passage of current through coil 415 but the switch member 428 continues to connect contacts 420, 422 for a preselected time interval and then move switch member 428 to an open condition. The time interval is sufficiently great that with the normal spacing of mints on belt 47, more than one mint will pass beneath, for example, wire 414 of switch 408. As a result the wrapping machine motor 260 is operated below its normal r.p.m. every time a mint passes switch 408 and thereafter as long as switch member 428 connects contacts 420, 422 as will be more apparent hereinafter.

Relay 392 also includes contact 430 that is connected by a line 431 to junction 405, a blank terminal 433, and a switch member 434 that in the delay de-energized condition connects contacts 424, 433, but in an energized condition connects contacts 424, 430.

The structure of this invention having been described, the operation will now be set forth. Assuming that the conveyor 51 is operating and carrying a plurality of unwrapped mints spread thereover in the direction of arrow 52, the switch 376 is operated to an on condition to energize motor 242 and motor 260 if switch member 401 is closed. The energization of motor 242 results in the upper run of the conveyor belt 49b being continuously driven in the direction of the arrow 50 and the upper run of conveyor belt 47 being driven in the direction of arrow 52 through the structure previously described. The energization of motor 260, which takes place when switch member 401 is closed, continuously drivingly rotates the primary drive shaft 265, and therethrough, the secondary drive shaft 270 as long as said switch member is closed.

After motor 242 is energized, a solenoid control for the piston cylinder combination 54d is operated whereby air is supplied to the cylinder 54d through lines (not shown) to cause the piston rod to move in the direction opposite arrow 50. This results in the gate 54a being pivoted from the solid line position of FIGURE 1 to the dotted line position of said figure wherein it is extended across the path of the mints being moved by the conveyor belt 51. As the mints engage the gate 54a they are forced to move over onto the rearward part of the upper run of the conveyor belt 49b. Upon the mints being moved onto conveyor belt 49b, they are then moved in the direction of the arrow 50 to the position that they engage the guide rail 56 which forces the mints to diagonally move in the direction of the arrow 59 to the slot designated by bracket 58a. The slot 58a is of a somewhat greater length than the diameter of the mint and upon a mint being adjacent slot 58, it is again moved by belt 49b in the direction of the arrow 50 to be located between the rearward ends of the guide rails 57. Since the guide rails 57 are extended diagonally across the belt 49b, the mints between said rails are moved one behind the other diagonally across the belt, and thence onto the upper run of the conveyor belt 47 to be moved in the direction of the arrow 52 to the infeed station X. Due to the provision of the hold down rail 60 and the hold down bar 66 the mints are precluded from piling one on top of the other, but rather maintained in horizontal alignment. However since rail 60 and the bar are resiliently held down, they can be moved upwardly for the passage therebeneath of an overly thick mint.

Assuming that the plunger 83 is in a position transversely to one side of the belt 47 (if not, the mint would abut against the plunger to be stopped thereby) the mint will be moved by belt 47 to abut against the stop 80 which will prevent further movement thereof in a longitudinal direction (see FIGURE 13). Assuming that the forwardmost mint 501 is momentarily detained in the position illustrated in FIGURE 13, the mint 502 in being advanced to abut against the mint 501 will be brought to a stop; the hold down bar 66 preventing mint 502 from moving in an upward direction while the rails 57 prevent the mint moving in a transverse direction.

For purposes of describing the invention, it will be assumed that at the 0° angular position of the shafts 265, 270 the plunger 83 substantially abuts against the shoulder formed by members 95, 104a of the drum assembly 13 and is axially aligned with the uppermost aperture 106 of the assembly 13. Further it will be assumed that the mint 500 of FIGURE 2 is in the position illustrated for mint 501 in FIGURE 13. Now as the secondary drive shaft 270 is moved from the 0° angular position; through the cam assembly 310, the radial arm 334 is pivoted in the direction of the arrow 490 from its uppermost position toward the position illustrated in FIGURE 4. This results in the connector link 335 being moved in a downward direction (arrow 491), this downward movement continuing for the first 90° of rotation of the shaft 270. That is the cam track assembly 310 is curved to give the cyclic motion illustrated in FIGURE 19 for the infeed plunger 83.

At the zero degree angular position of shaft 270, the radial arm 333 is in the solid line position of FIGURE 5. However as the linkage 335 begins to move downwardly, the arm 333 is rotated in the direction of arrow 492 toward the dotted line position of FIGURE 5. This pivotal movement of arm 333 moves rod 94 in the direction of arrow 493 and through the structure connecting said rod to plunger 83, the plunger is transversely translated toward drum assembly 12. The transverse movement of the plunger 83 brings one end thereof in abutting relationship with the mint 500 which is then abutting against stop 80 and moves said mint 500 in the direction of arrow 493 off the belt 47, and over the slide 97 and the shroud into the U-shaped cutout 106a of the uppermost aperture of assembly 12. To be mentioned is that the time the plunger 83 is being moved toward the drum assembly 12, said drum assembly is stationary.

At the dotted line position for arm 333 of FIGURE 5, the secondary drive shaft 270 has moved to the 90° angular position, and the plunger 83 has been moved to position the mint 500 in radial alignment with the aperture 106 as illustrated in FIGURE 2. The infeed plunger 83 remains in the FIGURE 2 position and the radial arm 334 in the position illustrated in FIGURE 4 between the 90° and 180° angular positions of the secondary drive shaft. Between the 180° and 270° positions of the shaft 270, the infeed plunger 83 is moved from the FIGURE 2 position to an analogous position relative to the drum assembly 13 to force the mint 501 to be located radially opposite the top aperture 106 of the drum assembly 13 which is then stationary. That is the cam track of cam assembly 310 is shaped such as that between the 180° and 270° angular positions of shaft 270, the radial arm 333 is pivoted from the dotted line position of FIGURE 5 to the solid line of said figure.

To be mentioned is that the motor 260 drives the main and secondary drive shafts at a faster rate than mints are fed to the drum assemblies by belt 47, i.e. when the switch member 401 connects contacts 395, 399 and switch member 397 connects contacts 391, 438. In order to control the rate of drive of the main and secondary drive shafts so that at most only a very few indexing movements of the drum assemblies will result in wrappers 116f being delivered to the FIGURE 5 position without a mint radially adjacent thereto to be wrapped, the operation of the control structure will now be set forth with reference to FIGURES 13 and 21.

Upon switch 396 being closed, the motor 242 will be driven to advance mints toward belt 47, it being assumed that at the start there are no mints on belt 47. Since at this time the slow down switch is closed, relay 392 will immediately be energized to move switch member 397 to connect contacts 391, 438 and switch member 434 to connect contacts 424, 430. Timer 416 is also energized but switch member 428 continues to connect contacts 420, 422 until the elapse of the timer interval. However the main and secondary drive shafts are not presently being driven since motor 260 remains de-energized until switch member 401 is closed by a mint passing beneath wire 397.

Thus until first closure of switch 396, the timer may go through one or more cycles and switch 408 be opened and closed one or more times before motor 260 is first energized.

After the first mint passes beneath wire 397, the motor 260 will be de-energized and accordingly until sufficient mints have backed up belt 47 to be in abutting relation from switch 396 to either stop 80, or plunger 83 if it is extended across the belt, the motor 260 will be energized and de-energized through successive passage of mints beneath wire 397. After mints have backed up in the aforementioned manner, the switch 401 will be retained in a closed condition due to a line of abutting mints therebeneath.

After the mints have backed up as described in the preceding paragraph, the motor 260 will be driven at its slower speed most of the time due to belt 47 conveying additional mints, each of the additional mints resulting in only opening switch 411 for much shorter intervals of time than the cycle of timer 416 which after being energized acts in conjunction with members 424, 430, 434 to provide hold in circuit for relay 392 to retain it energized for a preselected time even though during the preselected time mints result in switch member 411 being moved to an open condition. At the expiration of the preselected time, relay 392 is de-energized through switch member 428 moving to contact 429 (provided switch 408 is open) and remains de-energized until the slow down switch 408 is again closed.

During the time relay 392 is energized, the slow potentiometer is in the energizing circuit of motor 260 and if switch 396 is closed, the motor rotates at its lower r.p.m. which results in the drum assemblies being operated to wrap a lesser number of mints per given unit of time than the number of mints being advanced past a given point on conveyor 11a for the same unit of time. Of course if relay 392 is de-energized and switch 396 were closed the motor 260 would be driven at its normal speed, i.e. power applied across terminals 387, 388.

In view of the aforementioned operation of the controls and due to the fact the mints being conveyed toward belt 47 are spaced, relay 392, during short intermittent periods will be energized. However when mints have backed up in abutting relationship on belt 47 to a location opposite switch 408 or rearwardly thereof, the thus backed up mints will retain switch 411 in an open condition and then upon timer 416 running its timed cycle (if energized) switch 397 will connect contacts 437 and 438 so that motor 260 will be driven at its normal speed until mints are no longer backed up to or rearwardly (opposite arrow 52) of switch 408. At that time, switch 408 is again free to close and remains closed during the intervals of time between successively adjacent mints being moved beneath wire 414, the closing of switch 408 energizing timer 416 and relay 392 which breaks the connection between contacts 437, 438 and electrically connects contacts 391, 438 to place the slow potentiometer in the energizing circuit of motor 260. Of course as previously indicated during the interval switch member 401 is open due to no mint being abuttingly beneath wire 397, motor 260 is stopped. However normally the stop switch is closed due to the spacing of switches 396, 408 and the continuous supply of mints in abutting relationship passing beneath wire 397.

During the increment of time the secondary drive shaft 270 is rotating between the 0° and 215° angular positions, the two rollers 300a, 300b illustrated in FIGURE 4 abut against opposite sides of the indexer cam track portion 294a. As a result the drum assembly 12 which is driven through the rotation of the shaft 100 of said assembly remains stationary. However at about the 215° angular position of shaft 270, the indexer shaft 292 has rotated the cam 294 such that the last mentioned two rollers 300a, 300b engage the axially curved cam track portion 294b. This results in the rollers 300 being pivoted about the axis of shaft 100 in the direction of arrow 495 and thereby forces shaft 100 to rotate in said direction. At the 275° angular position of shaft 270, the rollers 300a, 300b move out of engagement with the track portion 249b, the roller 300a into engagement with the leading edge of track portion 294c and roller 300c into engagement with the trailing edge. As a result the shaft 100, and accordingly drum assembly 12, is caused to rotate in the direction of the arrow 495 until rollers 300c, 300b engage track portion 294a (335° angular position of shaft 270). Due to the construction of the indexer mechanism 290, for one complete rotation of the shaft 270 the drum assembly 12 is moved 30° for 120° of movement of shaft 270 and dwells for the 240° angular movement of said shaft 270. The aforementioned assumes that the drum assembly is provided with twelve apertures 106 and the corresponding number of rollers 300. The aforementioned movement of the drum assembly 12 between the 215° and 335° angular positions of shaft 270 advances the aperture 106 which is angularly rearwardly of that illustrated in FIGURE 2 to a position preparatory to having the mint 502 of FIGURE 13 moved by the plunger 83 thereinto.

As may be noted from FIGURE 19 the drum assembly 12 is being indexed during a portion of the time that the plunger 83 is being moved toward the drum assembly 13. However, between the 180° and 250° angular positions of the secondary drive shaft 270, the plunger 83 has been moved sufficiently away from the mint 500 (assembly 12) that the mint is not damaged by the movement of the drum assembly 12 to angularly advance it over the shroud.

The indexing movement of the drum assembly, for example drum assembly 12, also indexes the continuous web of wrapping material 116 due to the provision of the structure and drive connections set forth with reference to FIGURES 4–6. That is, in referring to FIGURE 3, the web is extended upwardly over the dancer roll 121 and thence downwardly along the 116a to enter the nip between the tension roll 123 and the drum assembly 12. The leading end portion of the web material, which is in advance of the aforementioned nip, overlies the annular member 104 angularly between said nip and a location adjacent the cut off assembly, said end portion being axially aligned to extend substantially the same axial distance on either side of the underlying drum apertures 106. In order to retain the end portion 116b (in part illustrated in FIGURE 7) in abutting relationship with the drum assembly 12, the web portion 116b passes between the nip of the drum member 104 and the O-rings 130 at roller 131; and between rollers 131 and 132 is retained in abutting frictional engagement with the drum member. In this connection (as may be noted from FIGURE 3), it is to be noted that the lower run of the O-rings 130 extend a substantial distance angularly on either side of the drum aperture at the uppermost portion of the drum to abut against portion 116b. As web portion 116b is indexed angularly in advance of roller 132, it is retained in abutting relationship with the annular drum member 104 by the fingers 141 which extend to a position closely adjacent the cut off assembly (see FIGURE 7).

During the period of time that the drum assembly 12 is being indexed, the knife 173 at the cut off station Y is in the portion of its path of movement such that it will not strike the drum assembly; this being accomplished through proper synchronization of the drive shaft 164 with reference to primary drive shaft 265. However, during the increment of time that the drum assembly 12 is in a dwell position, the chain 169 moves the knife 173 through the radially adjacent slot 110 to sever a portion 116c from the web 116b that is of the same arcuate length as that illustrated for 116f in FIGURE 15 to form a wrapper. To be mentioned is that the leading edge of the upper portion 116c is abuttingly located between the O-rings 136 extended over rolls 134, 135 and the drum assembly 12. Thus during the time knife 173 separates wrapper portion 116c from wrapper portion 116b, said portions are being held in a taut condition against drum member 104 by the O-rings 136 and the O-rings 130 in conjunction with the fingers 141. Upon the drum assembly 13 being indexed through the position corresponding to the 215 and the 325° angular position of shaft 270, a separate wrapper portion 116c is moved to the wrapping station Y to a position corresponding to that designated by 116d in FIGURE 7. To be mentioned is that the wrapper designated by 116d during this increment of time is retained in abutting relationship with the drum assembly 13 by the O-rings extended around rollers 134 and 135 (see FIGURE 5).

After drum assembly 12 has been indexed so that an increment of web material 116c of the length of the subsequently formed wrapper has been advanced angularly forwardly of the path of travel of knife 173, the chain 169 moves the knife 173 through the slot 110 directly therebeneath to sever web portion 116c from web portion 116b, and completes its passage therethrough prior to the indexing of the drum assembly 12. Likewise when the drum assembly 13 is in a station condition, the chain 170 moves the knife 171 through the slot directly therebeneath to sever another web portion 116c from the web 116b that abuts against the assembly 13.

Again referring to assembly 12, after severing web portion 116c, the knife is being moved to its path of travel away from the drum assembly 12, and subsequent indexing of the drum moves the web portion 116c to the position indicated by web portion 116d in FIGURE 7. Web portion 116d is held in contact with drum assembly 12 until it passes through the exit nip between roller 135 and the drum assembly. However prior to the time web portion 116d has been moved out of contact with the O-rings 136, the leading transverse edge thereof moves into the clearance space between the wrapping tube 203 and the drum assembly to free fall to the position of wrapper designated 116f in FIGURE 15. The movement of the wrapper portion between tube 203 and the drum assembly in a downward direction is limited by the leading edge of the wrapper abutting against brush 205. That is wrapper 116f is located axially in alignment with the plunger 178 and the wrapping tube 203 with a mint 207 being located intermediate web portion 116f and said plunger, the central axis of the mint being located substantially coextensive to the wrapper axis and the somewhat planar surfaces of the mint generally perpendicular to the wrapper axis.

To be mentioned is that the knives 171 and 173 are continuously driven; however the speed of drive thereof is synchronized with the indexing of the drum assemblies such that the knives will not strike the respective drum assembly but rather only pass through the radially adjacent slots 110. Also to be mentioned is that the angular rate of drive of the O-rings 136 (only being driven when the respective drum assembly is being indexed) is at a rate slightly faster than the angular rate of rotation of the drum assembly and thus places the unsevered web portion 116 under tension.

The mint 500, which was moved beneath the top aperture 106 of the drum assembly 12 as previously described, is indexed through a plurality of cycles of movement of the drum indexer 290 to be moved by the drum assembly 12 over the shroud to the position illustrated for a mint 207 in FIGURE 15. That is, at the same 0° angular position of the shaft 270 mentioned heretofore, the plunger 178 is in a datum solid line position illustrated in FIGURES 3 and 15. It is to be noted that even though FIGURE 15 illustrates assemblies 13, 20, this figure is also representative of the corresponding structure for assemblies 12, 19. As the secondary drive shaft is angularly moved past the 0° position the cam track of the cam assembly 311 causes the arm 344 to pivotally move upwardly through the linkage connections described heretofore to translate the plunger arm 177 in a forward direction (arrow 208) to move the plunger 178 through the adjacent aperture 106 at the 90° position of the drum assembly 12. The initial forward movement of the plunger brings it into contact with the back, generally planar surface of the mint 207 which had previously been indexed from the position of mint 500 in FIGURE 2 such that said surface is generally located on a vertical plane perpendicular to the wrapping axis, and forces it forwardly through aperture 106 to abut against the back surface of wrapper 116f. Then both mint 207 and wrapper portion 116f are moved in a forward direction into the mouth of the wrapper tube 203. Since the maximum inside diameter of tube 203 is larger than the mint, but substantially smaller than corresponding dimension of wrapper portion 116f, further forward movement of the mint results in the outer peripheral portions of wrapper 116f being folded downwardly over the circumferential surface of the mint to extend generally horizontally rearwardly.

Still further rotation of the secondary drive shaft results in the plunger and wrapper being pushed along the wrapper axis WA—WA through the clearance space between the outlet choke subassembly and the wrapping tube into the mouth 194 of the outlet choke. At the time the secondary drive shaft reaches its 90° angular position, the forward surface of the plunger 178 is located closely adjacent the mouth 194 such as illustrated in FIGURE 15 wherein the mint is substantially within the confines of the interior of the tubular members 196, 197 to be supported thereby. Since the axial dimension of the wrapper tube plus a diameter thereof is greater than the vertical and horizontal dimensions of the wrapper 116f, at this time the outer peripheral portions of the wrapper extend generally horizontally into the tube 203 (across the clearance space). During the movement of the secondary drive shaft between the 90° and 180° angular position, the plunger 178 is retracted to its datum position and thence dwells in the datum position until the 360° position of the secondary shaft 207.

Between the 0 and 90° angular position of shaft 207, the side folders 210 associated with assembly 12 are in a datum spread apart condition such as illustrated in FIGURE 14 for the folders associated with assembly 13. Through the cam assembly 313, the side folders of assembly 19 are retained in a datum condition during the 0° to a 90° angular position of the secondary drive shaft. However at the 90° position, the side folders begin to move together, i.e. at the time the plunger 178 of assembly 17 is in an out position. The side folders continue to come together while the plunger retracts and clears the plunger by a small distance (for example 1/16 of an inch) as it retracts. In this connection note from FIGURE 15 that the plunger is provided with diametrically opposed lands 403 that incline toward one another in a forward direction, the provision of the lands permitting the side folders coming more closely adjacent one another without striking the plunger as it is being retracted therebetween. Further since the horizontal dimension of the front surface of the plunger between the lands is less than the diameter of the mint, the side folders move inwardly sufficiently close to one another to prevent the mint tipping backwardly as the plunger retracts.

The side folders continue to come together for an angular increment about 65° to fold outer perimetric portions 207a of the wrapper 116f across the back face of the mint 207 such as illustrated in FIGURE 20a. The side folders then dwell until the 175° position of the secondary drive shaft wherein they are only spaced a fraction of an inch (for example 3/8 of an inch); and then during the next 40° of the rotation of the secondary drive shaft, the side folders retract to a datum position.

At the time the side folders begin their initial retraction, the bottom folder 224 and top folder 232 of assembly 19 (see FIGURE 14) which are operated through cam assemblies 315 and 317 respectively begin to move toward one another from their datum position, the bottom and top folders being at a datum position from the 0° to the 175° angular position of the secondary drive shaft. The top folder now moves downwardly for 30° angular movement of the secondary drive shaft to complete one third of its total downward path of movement and then dwells for 50°. However the bottom folder after it begins to move in upward direction, continues to advance toward the top folder to its maximum upwardly position, the bottom folder advancing through the first 65° angular movement of the secondary drive shaft after the 175° position, then dwells at its maximum upward position for 20° and then through 65° of further rotation of the secondary drive shaft, retracts to its datum position. The bottom folder then remains in its datum position until about the 175° angular position of another rotation of the secondary drive shaft. During the aforementioned upward movement of the bottom folder, the outer perimetric portion 207b of the wrapper 116f is folded upwardly against the back surface of the mint to at least part overlay the wrapper portions 207a such as illustrated in FIGURE 20b.

The timing of the advancement of the top and bottom folders toward one another relative the retraction of the side folders is such that they reach elevations to be vertically opposite the mint in members 195, 197 to preclude the mint tipping rearwardly. To permit the folders functioning in the aforementioned manner, the height of the side folders is substantially less than the diameter of the mint and the path of movement of the side folders is generally vertically centrally relative the wrapping axis WA—WA.

Figure 16:
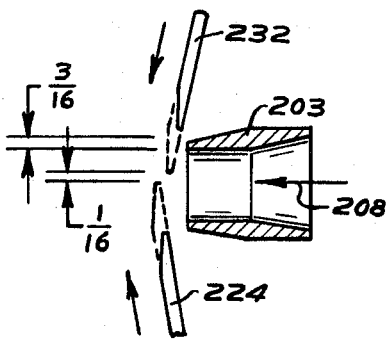
FIGURE 16 is a diagrammatic view illustrating the top and bottom folders in their datum dwell positions relative to the plunger tube in solid lines and their advanced positions in dotted lines.

At about the same time as the initiation of the retraction of the bottom folder toward its datum position, cam assembly 317 again operates the top folder to move from its intermediate dwell position to in the next 60° of rotation of the secondary drive shaft, move the top folder its maximum lower position (see dotted line position of FIGURE 16) to fold portion 207c to at least in part overlay the portion 207b which has been folded upwardly by the bottom folder. The top folder dwells in its lowermost position for 20° and during the next 70° is completely retracted from its lowermost position where it remains in this position for the next 120° of rotation of the secondary drive shaft.

To be mentioned is that at the time the bottom folder 224 is moved upwardly, due to it being moved to an inclined path of movement, as the surface 224a abuts against the bottom perimetric portion of the wrapper 116f and moves upwardly across the mouth 194 of the outlet choke subassembly, the mint and wrapper therein is pushed further inwardly into the outlet choke assembly. Likewise during the time the top folder completes its final ⅔ of the downward path of movement, the vertical surface 232a in abutting against the top perimetric portion of the wrapper, moves the wrapper and associated mint still further into the outlet choke assembly. Further the top folder at is lowest elevation is lower than the maximum elevation of the bottom folder but said folders do not stirke one another due to the timing of their movements. Additionally, as may be noted from FIGURE 19, as the top folder 232 initially begins to retract, the timing of a forward movement of the plunger 178 and the retraction of the top folder is such that at the time the top folder moved to a position vertically above the wrapped mint in the outlet choke, the next mint being moved forwardly by plunger 178 being sufficiently close to the wrapped mint that the wrapped mint cannot tip backwardly toward a horizontal condition. However the top folder is retracted sufficiently fast that it will not contact the next mint and wrapper than being advanced by the plunger 178.

As successive mints conveyed by assembly 12 are wrapped by the above described mechanism associated therewith, the rearwardmost mint in the outlet choke subassembly is pushed forwardly by the top and bottom folders, and by plunger 178 pushing another mint into said subassembly. Thus mints are successively forced out of said subassembly into the upwardly inclined chute 192 where they may, for example, be manually removed.

An advantage of folding the wrapper side portions first, then the bottom portion and finally the top portion is that as the operator brings his hand forwardly to grasp a plurality of mints from the chute 192, the grasping movement is in the same direction that the top outermost back wrapper portion (top portions) extends from the circumferential surface of the mint. This precludes any tendency to unwrap the mint as it is being grasped. Contrast this to if the bottom portion were folded last, the downward grasping movement would tend to fold it downwardly or move it away from the mint which is undesirable.

It may be noted that as cam assemblies 290, 311, 313, 317 and 315 operate the respective elements associated with drum assembly 12 as is stated above, cam assemblies 288, 312, 316, 314 and 319 that operate mechanism associated with drum assembly 13 operate the corresponding elements except 180° out of phase with the aforementioned elements associated with drum assembly 12. That is at the time the infeed plunger 83 is moving a mint into position beneath the top aperture of the drum assembly 13, the drum assembly 12 is being indexed; while when the drum assembly 13 is stationary, the wrapper plunger of assembly 18 is being moved in a forward direction. Likewise when the drum assembly 13 is being indexed, the infeed plunger 83 moves a mint in the opposite direction into position beneath the top aperture of the drum assembly 12 and the plunger of assembly 17 moves a mint at the wrapping station of drum assembly 12 to a position to be wrapped. Thus for every complete 360° revolution of the secondary drive shaft, two complete mint wrapping cycles are carried out, i.e. one by the elements associated with drum assembly 13 and the other by elements associated with the drum assembly 12 and the infeed plunger 83 would serve to sequentially feed a mint into one drum assembly and then another mint into the other drum assembly.

Although the apparatus of this invention has been disclosed with reference to wrapping mints it can be used to wrap other similarly shaped confectionery and non-confectionery products. Further it is to be understood the specific positions of the various members of the cam assemblies may be varied relative to the specific angular positions of the secondary drive shaft as set forth as long as the operating sequence is obtained.

Further due to the provision of the hold down mechanism of this invention, a greater variety of grades of wrapping material and different types of wrapping material may be used than with confectionery product wrapping machines of the art. This is due in part to the fact the web material is held in abutting contact with a drum assembly from angularly rearwardly of the infeed station to angularly in advance of the cut-off station and both the O-rings and drum assembly are driven to advance the web material.

As many widely apparently different embodiments of this invention may be made without departing from the spirit and scope thereof, it is to be understood that I do not limit myself to the specific embodiments herein.

What I claim is:

1. In apparatus for wrapping pieces of a confectionery product, a frame, a drum assembly for conveying said pieces of said product from one angular location to another, means for drivingly rotating and mounting said drum assembly for rotation about a given axis, said drum assembly including an exterior annular surface portion having a plurality of circumferentially spaced, elongated slots opening radially outwardly and elongated in a direction parallel to said axis, said drum rotating means including drive means for indexing the drum assembly in increments equal to the angular distance between adjacent slots and providing a dwell interval between each indexing movement, first means for feeding a continuous web and retaining an arcuate portion thereof in contact with said exterior surface angularly intermediate said locations, and means mounted on the frame for severing a wrapper from said arcuate portion of a length sufficient to wrap a piece of said product, the last mentioned means being mounted adjacent the retaining means and including a knife of a shape to be extendable into a slot and means on the frame for moving said knife through a continuous path including successively drawing it through the slots that are advanced radially adjacent thereto, said means on the frame for moving the knife including a driven sprocket, an idler sprocket mounted axially opposite each end of the slots, a linked chain extended around said sprockets, means mounting said knife on said chain in position to be drawn through a slot radially adjacent said chain, there being provided only one knife on said chain, and means for driving said drive sprocket at a rate that the knife will be only located in its path of movement to be drawn through a slot when the last mentioned slot has been advanced radially adjacent thereto and the drive means is in a dwell condition.

2. In apparatus for wrapping an unwrapped piece of product that has an infeed station, a wrapping station and a cutoff station intermediate said infeed station and wrapping station, a frame, drum means for conveying said piece from the infeed station to the wrapping station, means on the frame for rotatably mounting the drum means to rotate about a given axis, means connected to the drum mounting means for drivingly rotating it, said drum means having an exterior annular surface, means on the frame for feeding a web having a leading edge portion to the exterior surface of the drum means, first and second hold down means mounted on the frame in angular spaced relationship for retaining the web leading edge portion in abutting frictional engagement with the drum means to be moved therewith, said first and second hold down means being located angular rearwardly of the wrapping station with the second hold down means between the wrapping station and the cutoff station and the first hold down means extending adjacent to but on the opposite angular side of the cutoff station from the second hold down means, the first hold down means and the second hold down means each including an idler roll and a drive roll, and at least one O-ring extended around the idler roll and drive roll, said idler roll and drive roll being mounted on the frame in substantial spaced relationship to position a portion of the O-ring to bear against a substantial arcuate portion of the web leading edge portion, and means synchronized with the drum drive means for driving the drive roll of each of the first and second hold down means, means on the frame at the cutoff station for severing the web leading edge portion from the web along a line generally parallel to said axis to form a wrapper, and means synchronized with the drive means for the drum means for driving said severing means to operate said severing means to sever a wrapper of a length for wrapping said piece.

3. Apparatus for wrapping pieces of confectionery material comprising a frame, means on said frame for sequentially feeding pieces of confectionery material and a wrapper to adjacent one side of the pieces of the confectionery material to a given location with perimetric portions of the wrapper extending outwardly of all sides of a piece of said material, first tubular means mounted on said frame at said location on the opposite side of said wrapper from said piece at said location and opening toward said piece, said first tubular means being of a size and shape at least as large as said piece but smaller than said material, second tubular means mounted on said frame in alignment with said first tubular means and spaced therefrom, retractable means on the frame for pushing said piece at said location on the feeding means against said wrapper and thence said wrapper and said piece sufficiently through the first tubular means so that at least parts thereof are located in the second tubular means with portions of said wrapper bent to extend relative to said piece in a direction generally opposite the direction of movement of said piece and then retract, said pushing means including a plunger of a size and shape to be moved through an aperture and into the tubular means, and means on the frame for mounting said plunger within the confines of the drum member and moving said plunger through a drum aperture at said given location and into said tubular means when the drum assembly is dwelling, movable means on the frame for moving into said spaced to fold the bent portions of said wrapper to complete the wrapping of said piece after the pushing means starts to retract, and means mounted on the frame to operate the feeding means, the pushing means and the folding means in sequence in the aforementioned manner, said feeding means comprising a drum assembly having a drum member, said drum member having a plurality of circumferentially spaced apertures, each aperture of a size and shape for receivably moving one of said pieces, means cooperating with the drum member for retaining said pieces in said apertures until they are moved to said given locations, and means for indexingly rotating said drum assembly about a given axis with a dwell time between each indexing movement.

4. Apparatus for wrapping pieces of confectionery material comprising a frame, means on said frame for sequentially feeding pieces of confectionery material and a wrapper to adjacent one side of the pieces of the confectionery material to a given location with perimetric portions of the wrapper extending outwardly of all sides of a piece of said material, first tubular means mounted on said frame at said location on the opposite side of said wrapper from said piece at said location and opening toward said piece, said first tubular means being of a size and shape at least as large as said piece but smaller than said material, second tubular means mounted on said frame in alignment with said first tubular means and spaced therefrom, retractable means on the frame for pushing said piece at said location on the feeding means against said wrapper and thence said wrapper and said piece sufficiently through the first tubular means so that at least parts thereof are located in the second tubular means with portions of said wrapper bent to extend relative said piece in a direction generally opposite the direction of movement of said piece and then retract, and movable means on the frame for moving into said space to fold the bent portions of said wrapper to complete the wrapping of said piece after the pushing means starts to retract, and means mounted on the frame to operate the above mentioned feeding means, the pushing means and the folding means in sequence in the aforementioned manner, the above mentioned feeding means including a drum assembly having a drum member, said drum member having a plurality of circumferentially spaced apertures, each of a size and shape for receivably moving one of said pieces, means for feeding said pieces to said drum apertures, means cooperating with the drum member for retaining said pieces in said apertures until they are moved to said given location, means for indexingly rotating said drum assembly about a given axis with a dwell time between each indexing movement, means for feeding a web of wrapping material to the drum assembly and retaining said web in overlaying relationship on the drum member on the side opposite said retaining means including covering the drum apertures from angular rearwardly of the pieces received by the drum member to a position substantially angular in advance thereof, and means for operating said web feeding means in synchronism with the indexing of the drum member, and cutoff means on the frame angularly intermediate the means for feeding a piece to a drum aperture and said given location for severing a wrapper from the angular forward portion of the web on the drum member.

5. In apparatus having a longitudinal axis for conveying an unwrapped confectionery piece to a wrapping station, a frame, a drum member having an interior and exterior surfaces and a plurality of circumferentially spaced apertures opening through said surfaces and means forming a generally U-shaped slot extending radially inwardly of each aperture, and opening in a transverse direction, means on the frame for mounting said drum member for rotation about a transverse axis, means indexingly rotating said drum member about said transverse axis and causing it to dwell between said indexing movements, arcuately extending means on the frame extending adjacent said drum member for retaining a confectionery piece radially adjacent a given aperture to move with the drum member as it is indexed, said arcuate means extending within the interior of said drum member and having a trailing end portion adjacent the uppermost drum aperture that is radially spaced therefrom and an arcuate portion in advance thereof within close proximity of the U-shaped slot forming means, and means for transversely feeding a confectionery piece over said trailing end portion into said U-shaped slot.

6. In apparatus for conveyingly moving confectionery product pieces from one location to another comprising a frame, a drum assembly mounted on the frame for rotation about a horizontal transverse axis, said drum assembly including a drum member having a plurality of circumferentially spaced, transversely opening product piece receiving portions for moving the pieces received therein through an arcuate path, means on the frame for indexing said drum assembly through increments equal to the angular spacing between said product receiving portions, means for conveying product pieces in sequence to a location transversely opposite an upper product piece receiving portion in each indexed position, and reciprocating means synchronized with drum indexing means for moving a product piece from the conveyor means into said upper product receiving portion, said drum member having an annular main body portion and an annular flange joined thereto to extend transversely more adjacent the conveyor means in conjunction with the main body portion to provide a cylindrical exterior surface, and having an inner diameter greater than the inner diameter of said main body portion to form an annular vertical shoulder, said main body portion having a plurality of circumferential U-shaped cut outs opening through the said shoulder and of a size and shape to have at least a substantial portion of a product piece received therein, said annular flange and main body portion having a plurality of circumferentially spaced apertures opening through the exterior surface to a cut out, each in part radially coextensive with a portion of the adjacent cut out and of a size and shape to have a product piece move therethrough.

7. The apparatus of claim 2 further characterized in that drum drive means and means for driving the drive roll include means for indexing the drum mounting means and means driven by the drum mounting means for driving the drive rolls when the drum means is being indexed.

8. The apparatus of claim 7 further characterized in that the last mentioned means for driving the drive rolls includes means for driving the drive roll of the second hold down means at a greater angular rate than the other drive roll.

9. In apparatus for wrapping confectionery pieces and having a feeding station, a cut off station and a wrapping station, a sub-combination comprising a frame, a first and a second drum assembly mounted on said frame for rotation about a common transverse, horizontal axis for conveying confectionery pieces from the feeding station to the wrapping station, said drum assemblies being axially spaced from one another and oppositely faced, each of said drum assemblies including a drum member having an exterior surface, an interior surface and a plurality of circumferentially spaced confectionery piece apertures opening through said surfaces, means for alternately indexing one drum assembly and then the other drum assembly to rotate about said axis while providing a dwell time between each indexing movement, and means on the frame synchronized with the indexing means for conveyingly moving a confectionery piece to a drum aperture of one drum assembly at the feeding station and then a confectionery piece to a drum aperture at the feeding station of the other drum assembly.

10. The apparatus of claim 9 further characterized in that each drum assembly includes arcuate means on the frame and located closely adjacent the inner peripheral wall of the drum member for retaining the confectionery pieces radial adjacent the apertures to which they are fed until they have sequentially been moved to adjacent the wrapping station and that there is provided means on the frame for each drum assembly for feeding wrapper material and retaining it within close proximity of the exterior surface of the respective drum member and overlaying the drum member from a location angularly rearwardly of the feeding station to a position adjacent the wrapping station.

11. The apparatus of claim 10 further characterized in that there is provided driven means on the frame at the cut off station for severing a length of wrapping material, sufficient to wrap a confectionery piece from the material that is within close proximity of the respective drum member, and drive means for driving the severing means in timed relationship with the indexing means.

12. The structure of claim 10 further characterized in that the feeding and retaining means includes a first O-ring subassembly for each drum assembly, each first subassembly having an O-ring, means for mountingly driving said O-ring to have a substantial convex portion retain a portion of the web material in frictional engagement with the respective drum assembly from a location angularly rearwardly of the infeed station to a location angularly rearwardly of the cut off station, a second O-ring subassembly for each drum assembly, each second subassembly including an O-ring and second means for drivingly mounting said second O-ring to retain an arcuate portion of the web material in frictional engagement with the respective drum assembly from a location angularly forwardly of said cut off station to a position angularly rearwardly of said wrapping station, means mounted on the frame at the cut off station for severing a wrapper from the web material along a line generally parallel to said axis between said O-ring subassemblies as it is being held thereby and of a length sufficient to wrap a confectionery piece, and means for driving said severing means in timed relationship with the indexing means to sever a wrapper from the web portion associated with each drum assembly when the respective assembly is in a dwell position.

13. The apparatus of claim 12 further characterized in that there is provided separate means on the frame at the wrapping station in association with each drum assembly and adjacent the respective second O-ring subassembly for wrapping a severed wrapper about the confectionery piece that has been advanced to the wrapping station, each wrapping means including plunger means extendable through a drum aperture to an advanced position for pushing a confectionery piece out of an aperture to a location a substantial distance outwardly of the drum assembly, means on the frame for mounting the plunger means within the drum assembly and for moving the plunger means from a datum position within the drum assembly through tthe drum aperture at the wrapping station to said advanced position, operating means on the frame and connected to said plunger mounting and moving means to operate it in timed relationship with the indexing means, tubular means on the frame in alignment with the plunger means and of a shape to have the plunger passed therethrough for partially folding the outer perimetric portions of the severed wrapper to extend in a direction opposite the movement through the tubular means, and means on the frame at said location and spaced outwardly of the drum assembly with the tubular means intermediate it and the drum assembly for receiving the confectionery piece moved through the tubular means by the plunger means moving to its advanced position and completing the folding of said severed wrapper about said confectionery piece.

14. The apparatus of claim 13 further characterized in that completing the folding means including second tubular means on the frame in alignment with the first mentioned tubular means and adjacent the first tubular means and spaced therefrom for receivingly holding a confectionery piece moved through the first tubular means by the plunger means with the partially folded wrapper extended into said space, means on the frame and extendable into said space for finishing the folding of the wrapper about the confectionery piece being receivingly held by the second tubular means, and means on the frame for operating the finishing folding means in timed relation to the operation of the plunger means to accomplish the above.

15. The apparatus of claim 14 further characterized in that said second tubular means includes a pair of oppositely faced tubular sections, means for fixedly attaching one of said tubular sections to the frame, means for resiliently retaining the pair of tubular sections in abutting relationship and mounting the other tubular section for limited pivotal movement and also movement to a spread apart condition relative to the first tubular section.

16. The apparatus of claim 14 further characterized in that it has a wrapping axis, that said first and second tubular means are aligned with the wrapping axis and that the plunger moving means moves the plunger along said axis, and that the finished folding means includes a pair of side folders, a top folder and a bottom folder and that the finished folding operating means includes means for moving the side folders from a datum spread apart condition to an adjacent position in timed relation with the operation of the plunger means to facilitate retaining the confectionery piece in the second tubular means, fold side portions of the outer perimetric portions of the wrapper, and to return the side folders to a datum position, and means for operatively moving the bottom and top folders from a datum position in timed relation to one another and to the side folders to respectively fold the bottom and top perimetric portions of the wrapper after the side folders have been operated to complete the folding of the wrapper about said confectionery piece and to return the bottom and top folders to a datum condition.

17. The structure of claim 16 further characterized in that the bottom and top folder operating means includes two cam assemblies and means respectively connected to the top folder and bottom folder, and operated by the cam assemblies for moving the top and bottom folders from their datum positions before the side folders are fully retracted to engage adjacent outer perimetric portions of the wrapper and then to complete the folding of the bottom portion of the wrapper before the top portion, said cam assemblies having cams of a shape to impart the aforementioned movement to the top and bottom folders through the top and bottom cam operated means.

18. The structure of claim 16 further characterized in that the top and bottom folder operating means includes means connected to the bottom folder for directing the bottom folder to move into said space at an acute angle relative the wrapping axis so that the bottom folder will move the confectionery piece further into the second tubular means and means connected to the top folder for directing the top folder to move into said space at a sufficiently acute angle relative the wrapper axis to further move the confectionery piece into the second tubular means.

19. The apparatus of claim 16 further characterized in that the means for moving confectionery pieces to drum apertures includes a longitudinally extending continuous conveyor having a forward end portion extending between and at a lower elevation than the uppermost portions of the drum members, means on said conveyor for directing confectionery pieces in a row to a position successively transversely aligned with the uppermost aperture of a drum assembly in a dwell position, transverse means on either side of the conveyor to support a confectionery piece as it is moved to the respective drum assembly, second plunger means for moving the forwardmost confectionery piece on the conveyor over the last mentioned support means to the uppermost drum aperture of one drum assembly in a dwell position and then the confectionery piece on the conveyor that was rearwardly of said forwardmost confectionery pieces over the last mentioned support means to the uppermost aperture of the other drum assembly in its dwell position and means synchronized with indexing means for operating the last mentioned plunger means in the aforementioned manner.

20. The structure of claim 19 further characterized in that each O-ring drivingly mounting means includes a drive connection to the respective indexing means of the drum assembly that the O-ring is associated with; and that the wrapper plunger mounting and moving means, side folder moving means, the top and bottom folder operating means and second plunger means includes a drive shaft, a pair of wrapper plunger cam assemblies, a pair of side folder cam assemblies, a pair of bottom folder cam assemblies, a pair of top folder cam assemblies, a second plunger cam assembly; a separate drive connection between each cam assembly and the drive shaft to operate the respective cam assembly; a drive connection respectively between each cam assembly and each wrapping plunger means, each pair of side folders, each top folder, each bottom folder, and the wrapper plungers to operate the respective member through the drive shaft operating the cam assemblies; that each indexing means including an indexer connected to the respective drum assembly and means for driving each indexer from the drive shaft that there is provided means for driving the drive shaft and the severing drive means in synchronism; and that said conveyor includes separately operated drive means.

21. The structure of claim 19 further characterized in that there is provided a second conveyor drivenly connected to the first mentioned conveyor, sensing control means on the said conveyors for varying the speed of operation of the conveyor drive means in accordance with the number of confectionery pieces on said first conveyor to prevent an excess supply of confectionery pieces on said first conveyor.

22. Apparatus having an infeed station, a wrapping station and a cut off station angular between said infeed station and wrapping station for individually wrapping pieces of confectionery material comprising means for receiving pieces of said material at the infeed station and moving said pieces of material in indexing sequence through an arcuate path of movement including a drum member having circumferentially spaced apertures, means for sequentially feeding a piece of said material to within the drum member to the drum aperture at said infeed station, means on the frame for supplying a continuous web, means cooperating with the frame for supplying a continuous web, means cooperating with the drum member for receiving the web angularly rearwardly of said infeed station and retaining it in abutting relationship with the drum member to move therewith to the cut off station, means on the frame at the cut off station for severing a length of web to form a wrapper for a piece of confectionery material, means at the wrapping station exterior of the drum member for receiving a confectionery piece from the drum member and the severed wrapper from the cut off station and wrapping the wrapper about said piece, plunger means on the frame and extended into the drum member for moving a piece of said material out of the drum aperture at the wrapping station and to the wrapping means and cooperating with the wrapping means for making the initial fold in said wrapper, means connected to the drum assembly for sequentially indexing said drum assembly, and means for operating the piece feeding means, the cut off means, the plunger means and wrapping means in timed relationship with the drum assembly in the aforementioned manner.

23. Apparatus for individually wrapping pieces of confectionery material comprising a frame, a drum assembly mounted on said frame for rotary movement, about a given axis, said drum assembly including a drum member having a plurality of circumferentially spaced apertures, first means within the drum member for retaining a confectionery piece fed adjacent to one of the apertures within close proximity of the aperture for an extended angular distance as the drum member is rotated and driven means connected to the drum member to rotate it, means for sequentially feeding a confectionery piece into the interior of the drum member within close proximity of a drum aperture to be moved by the drum member relative said retaining means, a web feeding assembly mounted on the frame for supplying a run of web material, means mounted on the frame acting in cooperation with the drum member for holdingly feeding an arcuate section of the web material in contact with an arcuate portion of the drum member from a location angularly rearwardly of the aperture to which a piece is fed to a position substantially angularly forwardly of the last mentioned aperture, means on the frame for sequentially severing a length of the web material a size to form a wrapper for a confectionery piece from the portion of the web material adjacent said angularly forwardly position, second means cooperating with the drum member for feeding the severed wrapper to an angularly forward location and releasably retaining it angularly adjacent the drum member, said second means including tubular means located to be in axial alignment with a drum aperture during a dwell portion of the drum cycle and spaced outwardly of the frame sufficiently to have the severed wrapper move into the aforementioned space, an outlet choke assembly having a hollow interior aligned with said tubular means and spaced therefrom for receiving a confectionery piece, a plunger of a size and shape to be movable through a drum aperture and the tubular means, means mounted on the frame and extended into the drum member for mounting and selectively moving said plunger to move through the adjacent aperture and thereby force a confectionery piece out of said aperture and thence through the tubular means into the outlet choke assembly to fold the outer perimetric portions of the wrapper that was in said aforementioned space over the adjacent edges of the confectionery piece, means on the frame and movable into the space between said tubular means and outlet choke assembly to complete the folding of the wrapper about said piece and operating means for sequentially indexing the drum assembly to rotate about said axis, operating the confectionery feeding means to sequentially feed confectionery pieces to the drum member apertures; and operating the plunger moving means and the severing means in timed sequence.

24. The apparatus of claim 4 further characterized in that said drum member has a slot in the outer surface thereof extending substantially parallel to said axis and intermediate each adjacent pair of drum apertures, and that the cut off means includes a knife of a shape to be drawn through a slot, continuous means for mountingly moving said knife to draw it through a slot adjacent thereto to sever a wrapper from said web material and means on the frame for mountingly driving said continuous means to draw the knife through said slot only when the drum assembly is in a dwell condition.

25. The apparatus of claim 5 further characterized in that said transverse feeding means includes means for supporting a confectionery piece at about the same level as said trailing end portion, a plunger for moving a piece off said supporting means into the adjacent U-shaped slot and means for reciprocating said plunger to move it toward the U-shaped slot above said trailing edge portion when the drum assembly is dwelling.

26. In apparatus for conveyingly moving confectionery product pieces from one location to another comprising a frame, a drum assembly mounted on the frame for rotation about a horizontal transverse axis for conveying said pieces through an arcuate path, said drum assembly including a drum member having an annular main body portion and an annular flange joined thereto to extend transversely more adjacent the conveyor means than the main body portion in conjunction with the main body portion to provide a cylindrical exterior surface, and having an inner diameter greater than the inner diameter of said main body portion to form an annular vertical shoulder, said main body portion having a plurality of circumferential U-shaped cut outs transversely opening through said shoulder and of a size and shape to have at least a substantial portion of a product piece received therein, said annular flange and main body portion having a plurality of circumferentially spaced apertures each of which opens through the exterior surface to a cut out, in part is radially coextensive with a portion of the adjacent cut out, and of a size and shape to have a product piece move therethrough, means on the frame for indexing said drum assembly through increments equal to the angular spacing between said cut outs, means for conveying product pieces in sequence to a location transversely opposite an upper cut out in each indexed position, and reciprocating means synchronized with drum indexing means for moving a product piece from the conveyor means into said upper cut out, said reciprocating means including a plunger having a dimension parallel to a radius of the drum member that is less than the radial dimension of said shoulder, means slideably mounting said plunger on the frame and transversely moving it over the conveyor means to a position to at least partially extend into the space axially bounded by said annular flange, a plunger cam assembly synchronizingly driven with the indexing means, said cam assembly having a cam follower, and linkage means connecting the cam follower to the plunger moving means for sequencing the movement of the plunger with drum assembly.

References Cited

UNITED STATES PATENTS

| | | | |
|---|---|---|---|
| 1,102,832 | 7/1914 | Wetmore | 198—31 |
| 1,392,683 | 10/1921 | Hackett et al. | 53—221 |
| 1,517,307 | 12/1924 | Molins | 53—223 X |
| 1,543,296 | 6/1925 | Peters et al. | 53—234 |
| 1,597,528 | 8/1926 | Lavenstein | 53—221 |
| 1,927,404 | 9/1933 | Jensen | 53—223 X |
| 2,083,617 | 6/1937 | Salfisberg | 53—178 X |
| 2,385,692 | 9/1945 | Corbin et al. | 83—411 X |
| 2,546,059 | 3/1951 | Cloud | 53—191 X |
| 2,653,430 | 9/1953 | Vogt | 53—34 |
| 2,849,104 | 8/1958 | Moeltzner | 198—211 |
| 2,985,991 | 5/1961 | Habgood | 53—225 X |
| 3,035,379 | 5/1962 | Cloots | 53—34 |
| 3,191,748 | 6/1965 | Martin | 198—25 |

WILLIAM W. DYER, Jr., *Primary Examiner.*

N. ABRAMS, *Assistant Examiner.*